United States Patent
Hoffmann

(10) Patent No.: US 9,644,864 B2
(45) Date of Patent: May 9, 2017

(54) SOLAR OVEN POSITIONING

(71) Applicant: Thomas Mark Hoffmann, Santa Cruz, CA (US)

(72) Inventor: Thomas Mark Hoffmann, Santa Cruz, CA (US)

(*) Notice: Subject to any disclaimer, the term of this patent is extended or adjusted under 35 U.S.C. 154(b) by 476 days.

(21) Appl. No.: 13/916,499

(22) Filed: Jun. 12, 2013

(65) Prior Publication Data
US 2014/0251314 A1    Sep. 11, 2014

Related U.S. Application Data

(60) Provisional application No. 61/774,563, filed on Mar. 7, 2013.

(51) Int. Cl.
| | |
|---|---|
| *F24J 2/00* | (2014.01) |
| *F24J 2/02* | (2006.01) |
| *F24J 2/52* | (2006.01) |
| *F24J 2/54* | (2006.01) |
| *F24J 2/38* | (2014.01) |

(52) U.S. Cl.
CPC ............... *F24J 2/02* (2013.01); *F24J 2/5266* (2013.01); *F24J 2/542* (2013.01); *F24J 2/38* (2013.01); *Y02B 10/20* (2013.01); *Y02B 40/18* (2013.01); *Y02E 10/47* (2013.01)

(58) Field of Classification Search
CPC .......... Y02B 40/18; Y02E 10/00; Y02E 10/47
USPC ........................ 126/714, 600, 681
See application file for complete search history.

(56) References Cited

U.S. PATENT DOCUMENTS

| | | | | |
|---|---|---|---|---|
| 1,783,410 A | * | 12/1930 | Cowell ...................... | F16L 3/04 174/157 |
| 3,613,659 A | * | 10/1971 | Phillips ...................... | F24J 2/02 126/573 |
| 3,938,497 A | * | 2/1976 | Andrassy ................... | F24J 2/02 126/400 |
| 4,018,212 A | | 4/1977 | Hein et al. | |
| 4,083,357 A | * | 4/1978 | Fischer ...................... | F24J 2/02 126/682 |
| 4,125,109 A | * | 11/1978 | Erwin ........................ | F24J 2/02 126/681 |
| 4,220,141 A | | 9/1980 | Way, Jr. | |
| 4,261,333 A | * | 4/1981 | Guarnaschelli ........ | F24J 2/4647 126/612 |
| 4,292,957 A | | 10/1981 | Golder | |
| 4,356,812 A | * | 11/1982 | Haven ........................ | F24J 2/10 126/572 |
| 4,364,183 A | | 12/1982 | Rhodes | |
| 4,378,790 A | * | 4/1983 | Erwin ........................ | F24J 2/02 126/681 |
| 4,585,318 A | * | 4/1986 | Seifert ........................ | F24J 2/02 126/573 |
| 4,655,196 A | * | 4/1987 | Kerr ........................... | F24J 2/02 126/606 |
| 4,696,285 A | * | 9/1987 | Zwach ........................ | F24J 2/02 126/573 |

(Continued)

*Primary Examiner* — Avinash Savani
*Assistant Examiner* — George R Blum
(74) *Attorney, Agent, or Firm* — Douglas L. Weller

(57) ABSTRACT

A positioning system is attached to radiation collection device such as a solar oven. The positioning system is attached to an outside of a building structure, allowing the collection device to be positioned in a plurality of locations. At least one of the plurality of locations is away from the building structure to allow the radiation collection device to collect solar radiation.

20 Claims, 16 Drawing Sheets

(56) References Cited

U.S. PATENT DOCUMENTS

| | | | |
|---|---|---|---|
| 4,848,320 A | 7/1989 | Burns et al. | |
| 4,979,494 A * | 12/1990 | Andersen | F24J 2/02 126/573 |
| 5,139,010 A | 8/1992 | Borgens, Jr. et al. | |
| 5,529,054 A * | 6/1996 | Shoen | F24J 2/07 126/600 |
| 5,617,843 A * | 4/1997 | Erwin | F24J 2/02 126/608 |
| 6,284,968 B1 * | 9/2001 | Niesyn | F24J 2/13 126/600 |
| 6,588,418 B1 * | 7/2003 | Loving | F24B 1/207 126/276 |
| 6,959,993 B2 * | 11/2005 | Gross | F24J 2/07 126/684 |
| 6,960,717 B2 * | 11/2005 | Stuart | F24J 2/541 126/600 |
| 8,151,787 B1 * | 4/2012 | Sivert | F24J 2/38 126/608 |
| 8,893,710 B2 * | 11/2014 | Geris | H01L 31/0525 126/600 |
| 8,933,323 B1 * | 1/2015 | Gu | F24J 2/02 136/246 |
| 9,010,316 B1 * | 4/2015 | Corbell, Sr. | F24J 2/38 126/572 |
| 9,038,386 B2 * | 5/2015 | De Martino | F24J 2/055 126/617 |
| 2002/0148940 A1 * | 10/2002 | Lee | B60N 3/16 248/352 |
| 2007/0033828 A1 * | 2/2007 | Hartkop | A23N 12/08 34/443 |
| 2011/0021134 A1 * | 1/2011 | Zwern | C02F 1/04 454/343 |
| 2012/0042873 A1 * | 2/2012 | Lim | A47J 39/00 126/681 |
| 2013/0082156 A1 * | 4/2013 | Conner | F16M 11/08 248/281.11 |
| 2013/0187019 A1 * | 7/2013 | Dittmer | F16M 11/10 248/277.1 |

\* cited by examiner

SOLAR OVEN POSITIONING

BACKGROUND

A solar oven uses the energy of direct sunlight to heat food or drink. Solar cooking is a form of outdoor cooking and is often used where it is desired to minimize fuel consumption. Use of solar ovens helps reduce fuel costs and air pollution. It can also help to slow down deforestation and desertification where the alternative is to use gathered firewood for cooking.

A solar oven produces heat by concentrating sunlight and converting the light to infrared heat. Typically, a reflective mirror of polished glass, metal metalized film concentrates light that then is used to produce heat from the sun. The heat is contained in a small cooking area. A solar oven makes efficient heat by the conversion of light to heat. This is done, for example, by using a black or other low reflectivity surface on cooking containers to create heat that is added and trapped in the cooking area.

The solar oven is positioned towards the sun in order to maximize heat generation. As the sun travels across the sky, the position of the solar oven can be adjusted to optimize position with respect to the sun and to avoid shadows. When the solar oven is to be used for several hours untended, the solar oven can be turned to face the zenith of the sun's path so as to optimize captured radiation during the day.

LIST OF REFERENCE NUMERALS

Figure 1:
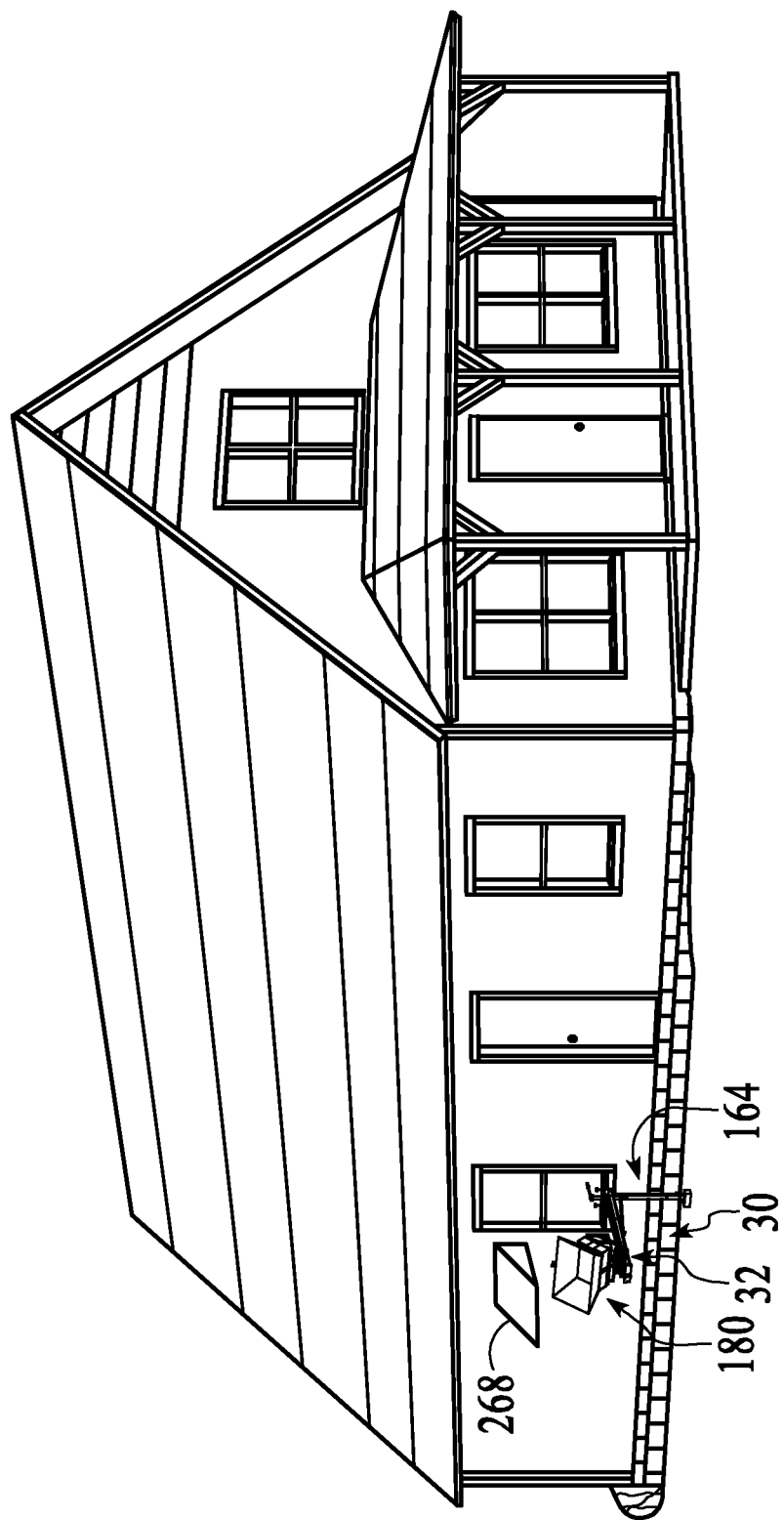
FIG. 1 is a perspective overall view of a solar oven system installed onto a building structure in accordance with an embodiment.

30 Solar Oven System
32 Extended Positioning System
34 Structural Extension Assembly
36 U-shaped Channel Rail Members (36R & 36 L)
38 Cross Members
40 Pivot Weldment
42 Vertical Pivoting Member
44 Horizontal Beam Supporting Member
46 Welded Stud
48 Beam Suspension Support Truss Assembly
50 Brace Bar
52 Brace Bar Attachment Bracket
54 Weldment Pivot Bearing Collar
56 Cable Drive Spool Collar
58 Moveable Carriage
60 Rollers & Carriage Retaining Assembly
62 Roller Bracket
64 Lateral Shafts & Rollers Assembly
66 Lateral Roller Shaft
68 Lateral Roller
70 Vertical Load Shafts, Bearing Rollers, & Collars Assembly
72 Vertical Load Shaft
74 Vertical Load Bearing Roller
76 Vertical Load Shaft Collar
78 Base plate Assembly
80 Base Plate
82 Nesting pins
84 Solar Altitude Cable Winch Assembly
86 Solar Altitude Worm Gear Drive Mechanism
88 Solar Altitude Worm
90 Solar Altitude Worm Gear
92 Solar Altitude Worm Gear Housing
94 Cable Winch Drum & Shaft Assembly
96 Cable Winch Shaft
98 Cable Winch Drum
100 Cable Winch Cable
102 Azimuth Bearing Drive Roller Assembly
104 Azimuth Worm Gear drive Mechanism
106 Azimuth Worm
108 Azimuth Worm Gear
110 Azimuth Worm Gear Housing
112 Drive Roller & Drive Roller Shaft Assembly
114 Drive Roller Shaft
116 Drive Roller
118 Drive Roller Collar
120 Remote Control Mechanisms & Devices
122 Linear Hand Wheel
124 Cable Drive Spool
126 Cable Loop Pulley
128 Cable Loop Pulley Mount Plate Bracket
130 Carriage Drive Cable
132 Azimuth Hand Wheel & Hand Wheel Drive Shaft Assembly 134 Azimuth Hand Wheel
136 Azimuth Hand Wheel Drive Shaft
138 Azimuth Miter Gear Drive Shaft Bracket
140 Azimuth Miter Gears
142 Azimuth "D" Profile Drive Shaft
144 Solar Altitude Hand Wheel & Hand Wheel Drive Shaft Assembly
146 Solar Altitude Hand Wheel
148 Solar Altitude Hand Wheel Drive Shaft
150 Solar Altitude Miter Gear Drive Shaft Bracket
152 Solar Altitude Miter Gears
154 Solar Altitude "D" Profile Drive Shaft
156 Extendable Lever Handle
158 Access Knob Positioning Collar
160 Sliding Drive Block Pivot Yoke
162 Wrench drive plug
164 Wall Mount System
166 Pivot Post Saddle Weldment
168 "M" Shape Saddle
170 Saddle Top Retaining Stud
172 Saddle Bottom Retaining Bracket
174 Pivot Post
176 Pivot Post straps
178 Ground Foundation Block
180 Box Solar Oven Assembly
182 Insulated Foam Box
184 Foam Box Top
186 Foam Box Sides (186R & 186L)
188 Foam Box Bottom
192 Hoop Strap
194 Flange Bearings
196 Glazier
198 Glazier Spacer Frame
200 Glaser "L" Bracket Retaining Clips
202 Solar Collector Panel Mount Retainer & Insulating Enclosure Frame Assembly
204 Solar Collector Panel Mount Retainer & Insulating Enclosure Frame
208 Solar Collector Panels Assembly
210 Solar Collector panels
212 Cover Protector Assembly
214 Cover Protector
216 Solar Altitude Cable Attach Bracket
218 Door Assembly
220 Door
222 Door Handle
228 Yoke Member
230 Food Rack & Supports Assembly
234 Horizontal Pivot Bearing Bolt
236 Food Rack Side Plates
238 Food Rack Cross Rods
240 Food Rack Horizontal Plate
242 Azimuth Bearing & Pedestal Base Assembly
244 Azimuth 12 Inch Bearing Top Mount Plate
246 Azimuth 12 Inch Bearing Bottom Mount Plate
248 Pedestal Base
250 Azimuth 12 Inch Bearing
252 Center of Gravity Biaser Spring
254 Solar Altitude Locking Bar
256 Light Alignment Indicator Assembly
258 Tube Scope Box mounting bracket
260 Light Indicator Tube
262 Translucent Light Target Assembly
264 Translucent Target
266 Target Mounting bracket
268 Protective storage shelter cover
270 Azimuth Servomotor
272 Azimuth Servomotor Mount Bracket
274 Solar Altitude Servomotor
276 Solar Altitude Servomotor Mount Bracket
278 Feedback Light Sensor Unit
280 Azimuth Servo Drive Coupling
282 Solar Altitude Servo Drive Coupling
284 Solar Tracking Controller

DETAILED DESCRIPTION

A solar oven system is installed on an outside wall of a building structure outside the cooking area and accessed through a window or other opening accessible from within the cooking area with the apparatus reaching out away from the building structure into the outside environment when operated. The solar oven system integrates all of the needed solutions of the various operation process steps and numerous problems related to the requirements of the entire solar cooking process into one complete seamless cohesive operation.

Figure 2:
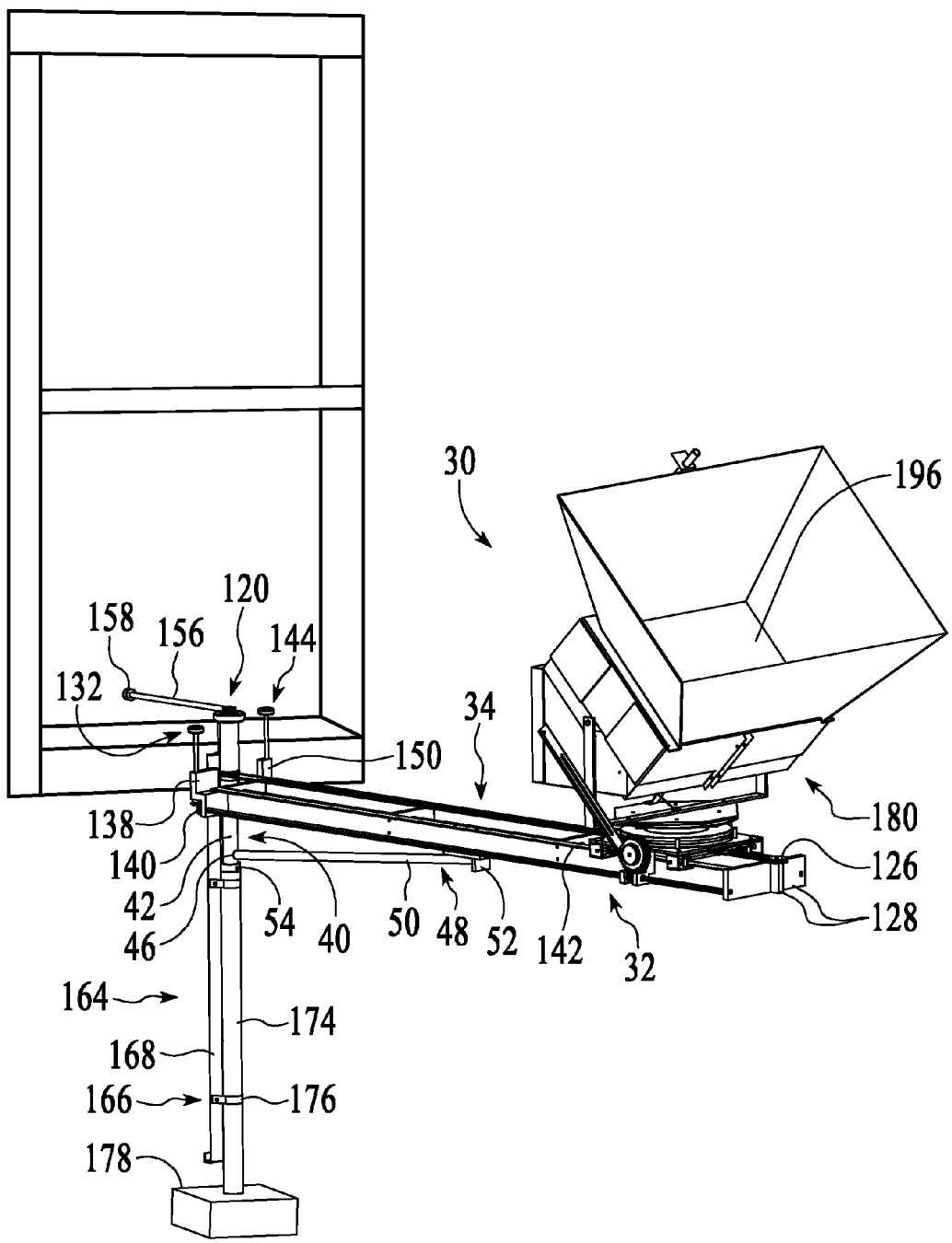
FIG. 2 is a front perspective view, from outside of a building, of a solar oven system installed on a building structure at a window opening in accordance with an embodiment.

FIG. 1 and FIG. 2, of the solar oven system 30 shows a basic version of a solar oven system embodiment installed onto a building structure. A solar oven system 30 includes an extended positioning system 32 and a radiation collection device. For example, the radiation collection system is represented in FIGS. 1 and 2 by a box solar oven assembly 180. Box solar oven assembly 180 is used for converting solar energy into heat for cooking food or other solar processes. Positioning system 32 is used to deploy, and align box solar oven assembly 180.

The extended positioning system 32 is installed, mounted, or connected onto the wall by features in FIGS. 3, 4, 5, & 10 with a saddle top retaining stud 170, saddle bottom retaining bracket 172, and a ground foundation block 178. A wall mount system 164 includes a pivot post saddle weldment 166, of which includes an M-shape saddle 168 (FIG. 10) to nest a pivot post 174, saddle top retaining stud 170 for top attachment to the building structure, and a saddle bottom retaining bracket 172 for the bottom attachment to the building structure. The wall mount system 164 also includes a pivot post 174 for receiving a pivot weldment 40, two pivot post straps 176 to secure and adjust the pivot post into a pivot post saddle weldment 166, and a ground foundation block 178 to support the vertical component force loads of an embodiment itself and its process operation loads.

The saddle top retaining stud 170 is inserted into a hole located in the underside of the exterior lower horizontal window frame material or is already provided by the existing vertical grooves in the building siding material, (such as "T111 and other siding materials with vertical groove features) when the lower horizontal window frame material is mounted over the grooves which then provides a hole feature which can be used as the retaining hole to secure the upper portion of the wall mount system. The saddle bottom retaining bracket 172 slides behind and onto the lower edge of the building siding material between the vertical flange of the saddle bottom retaining bracket 172 and the M-shape saddle 168 mounting surface therefore retaining the lower portion of the wall mount onto the wall material. The M-shape saddle 168 is configured to provide the center portion of the design to protrude out beyond the outer edges or general surface plane of the wall mounting surface of the M-shape saddle 168 therefore providing insertion of the M-shape saddle 168 center material protruding into the siding vertical groove for preventing twisting after mounting and adding strength and retention of the system in any position after installation. The ground foundation block 178 supports the entire vertical component load force vector after adjusting and setting of the installation to the wall. This design removes (or prevents) the vertical load force component vector from the installed pivot post saddle weldment 166 and keeps the wall mount system 164 from disengaging vertically downward. It does this by first redirecting all the vertical load force directly down onto the ground providing for a load path which provides no unnecessary vertical force on wall mount weldment 166, therefore, not requiring additional fastening methods in order to retain the wall mount weldment 166 vertically onto the building structure. The pivot post straps 176, after installed and setup, only provide retaining of the pivot post 174 into the pivot post saddle weldment 166 in the horizontal component force vector loading directions.

Figure 4:
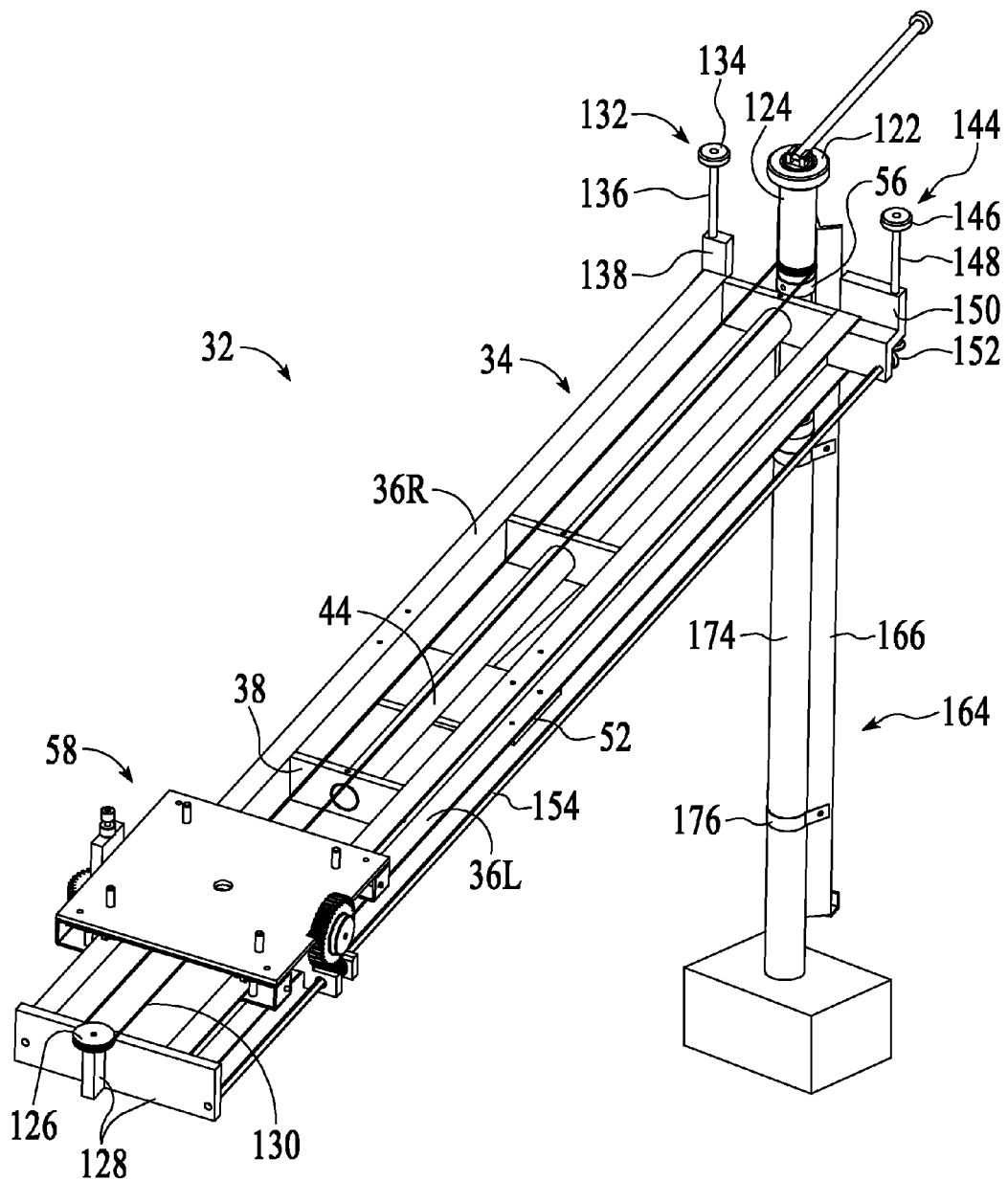
FIG. 4 is a perspective view of an extended positioning system in accordance with an embodiment.

The wall mount system 164 is installed on to the wall by inserting and sliding the pivot post saddle weldment 166 into the groove of the siding material and simultaneously sliding up and in both the saddle top retaining stud 170 along with the saddle bottom retaining bracket 172 simultaneously into their proper securing locations on the wall as previously described above. The pivot post 174 is then inserted into the "M" shape saddle 168 nesting feature as shown in FIG. 4 with the two pivot post straps 176 while loading a downward vertical force of the pivot post 174 onto the ground foundation block 178 before tightening the two pivot post straps 176 in place. As stated above, this design and setup prevents the vertical load force from siding out the upper and lower retaining features of the previously described pivot post saddle weldment 166. No fasteners are required to make the secure installation to the building wall because of this vertical load path design directing to the ground foundation block 178 first, which again, prevents sliding out of the weldment 166 retaining features.

Figure 5:
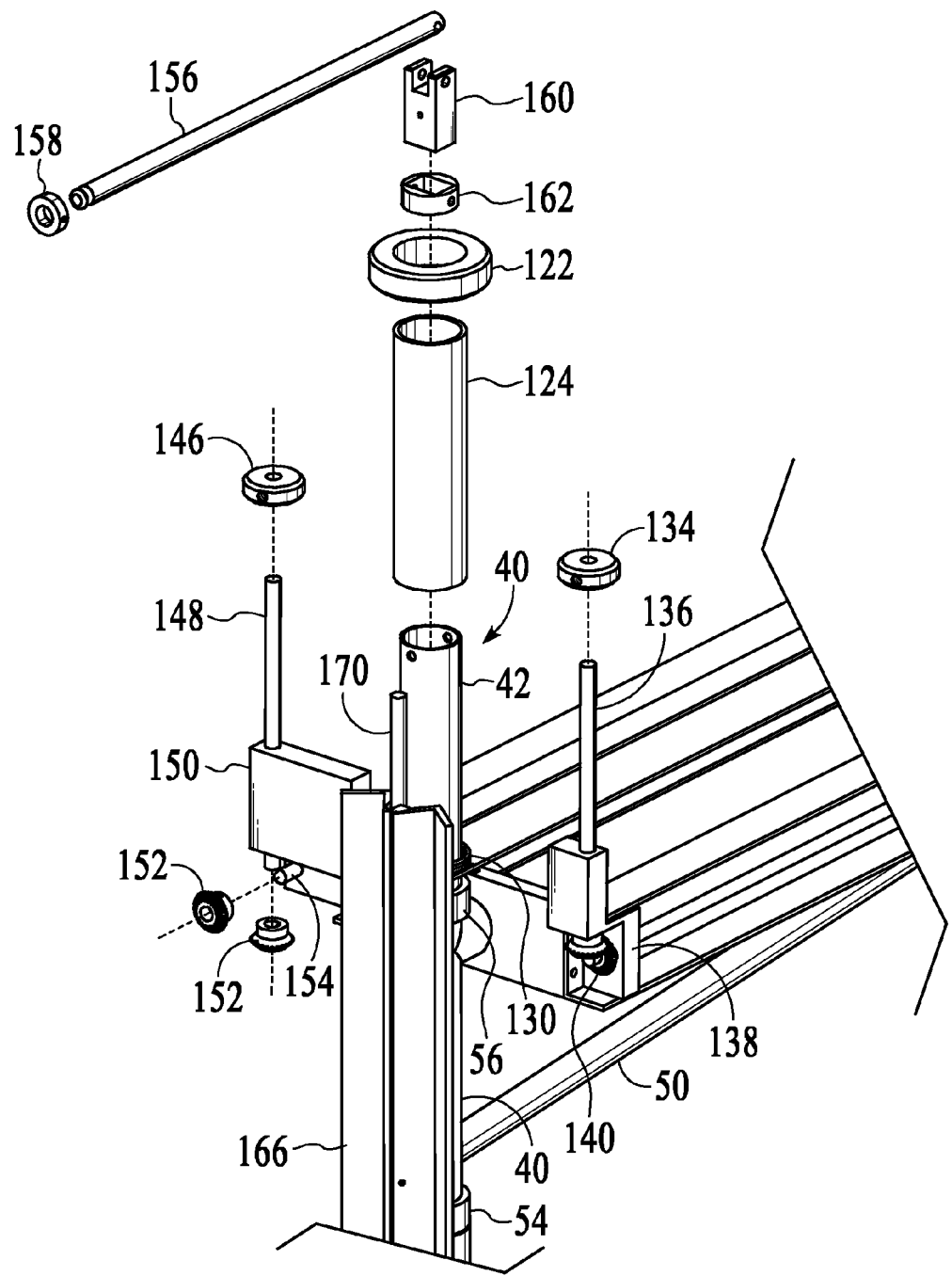
FIG. 5 is an exploded partial view of remote control elements and other extended positioning system features including a wall mount weldment.

Extended positioning system 32 in FIGS. 2, 4, and 5 includes a structural extension assembly 34 that provides linear extension and manipulation of the box solar oven assembly 180 out away from the building structure. The structural extension 34 includes two U-shape channel rail members 36R and 36L connected together by cross members 38 assembled by screws, welds or other standard structural attachment methods. Referring to FIG. 4, the cross members 38 have a hole in the center with set screws at the plate edge in order to receive and secure for attachment a horizontal beam supporting member 44 of a pivot weldment 40.

The pivot weldment 40 includes a vertical pivoting member 42 including a feature of a welded stud 46 for brace bar 50 attachment for structural support and a horizontal beam supporting member 44 which provides pivoting attachment of the structural extension 34 to the wall mount system 164. Set screws provided in the structural extension 34 cross members 38 are used to secure to the horizontal beam supporting member 44. A lower portion of the vertical pivoting member 42 of the pivot weldment 40 is then slip fit into the top of the pivot post 174 in FIGS. 2 and 4 to allow pivoting (angular rotation) of the structural extension 34 using an extendable lever handle 156 by the operator. A beam suspension support truss assembly 48, made up of the brace bar 50 and a brace bar attachment bracket 52 attached with screws or other methods to the structural extension 34 provides structural strength required to significantly extend and support operational load weights during operations.

Figure 6:
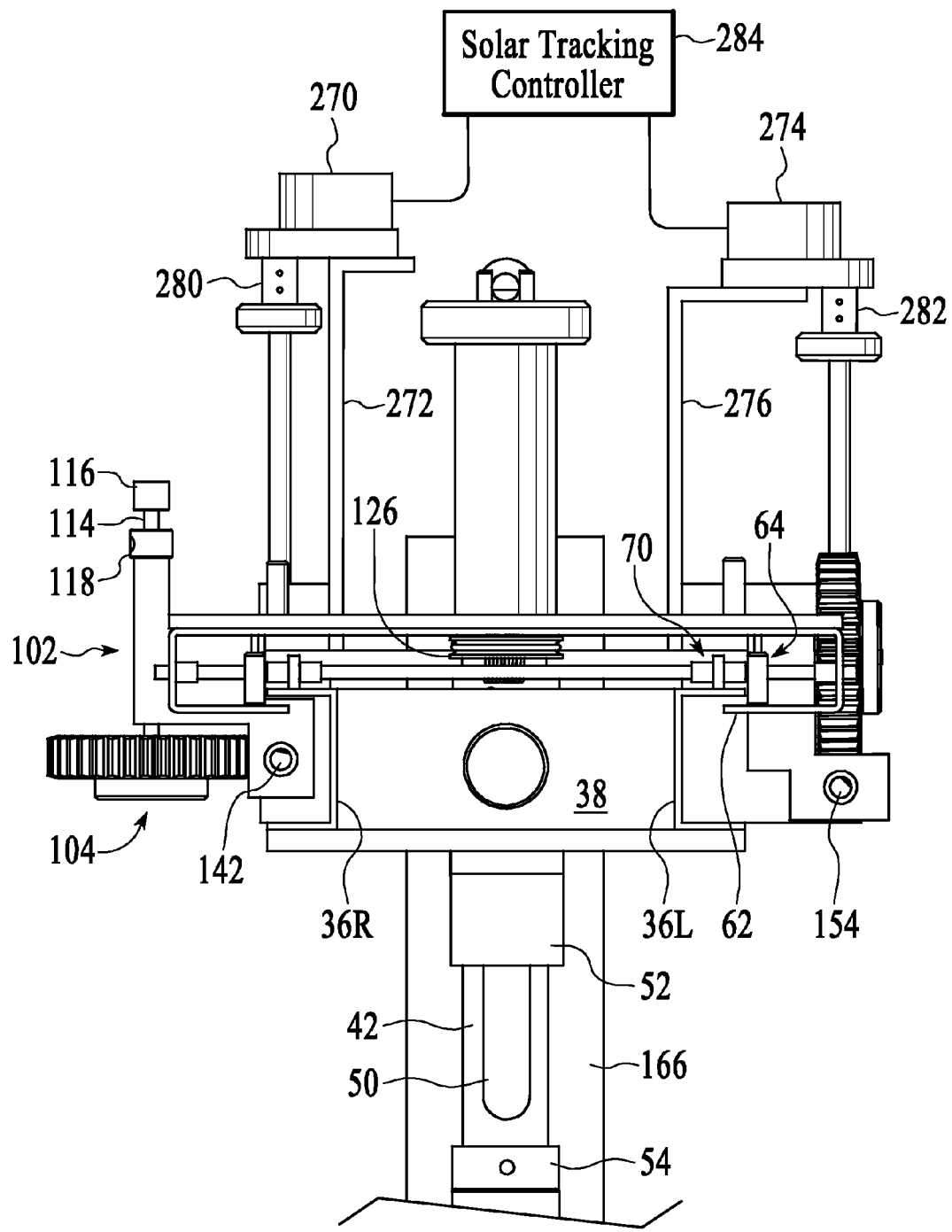
FIG. 6 is an end view of an upper portion of an extended positioning system structural extension assembly showing a movable carriage connected to the structural extension assembly.
Figure 7:
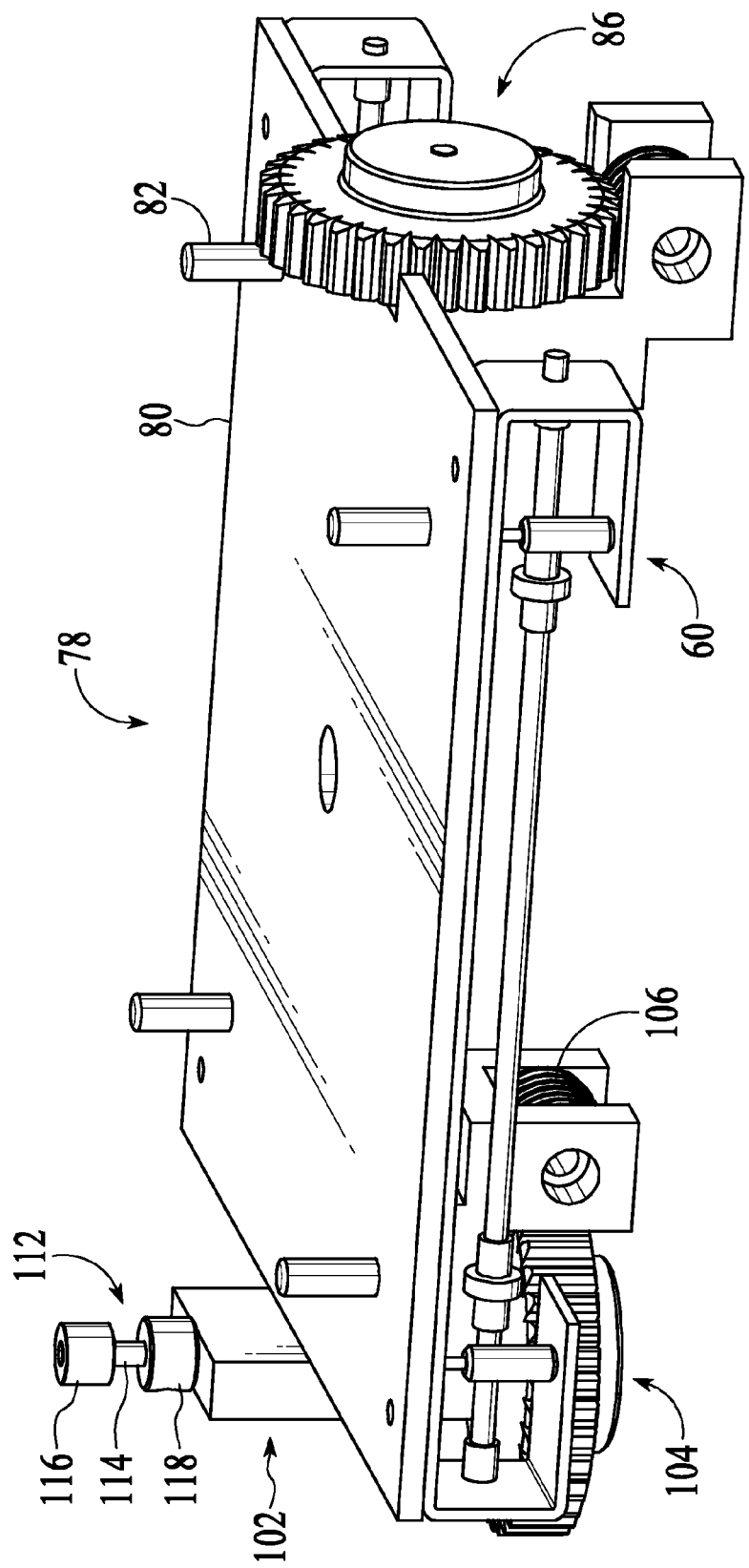
FIG. 7 is a front and top perspective view of a moveable carriage assembly.
Figure 9:
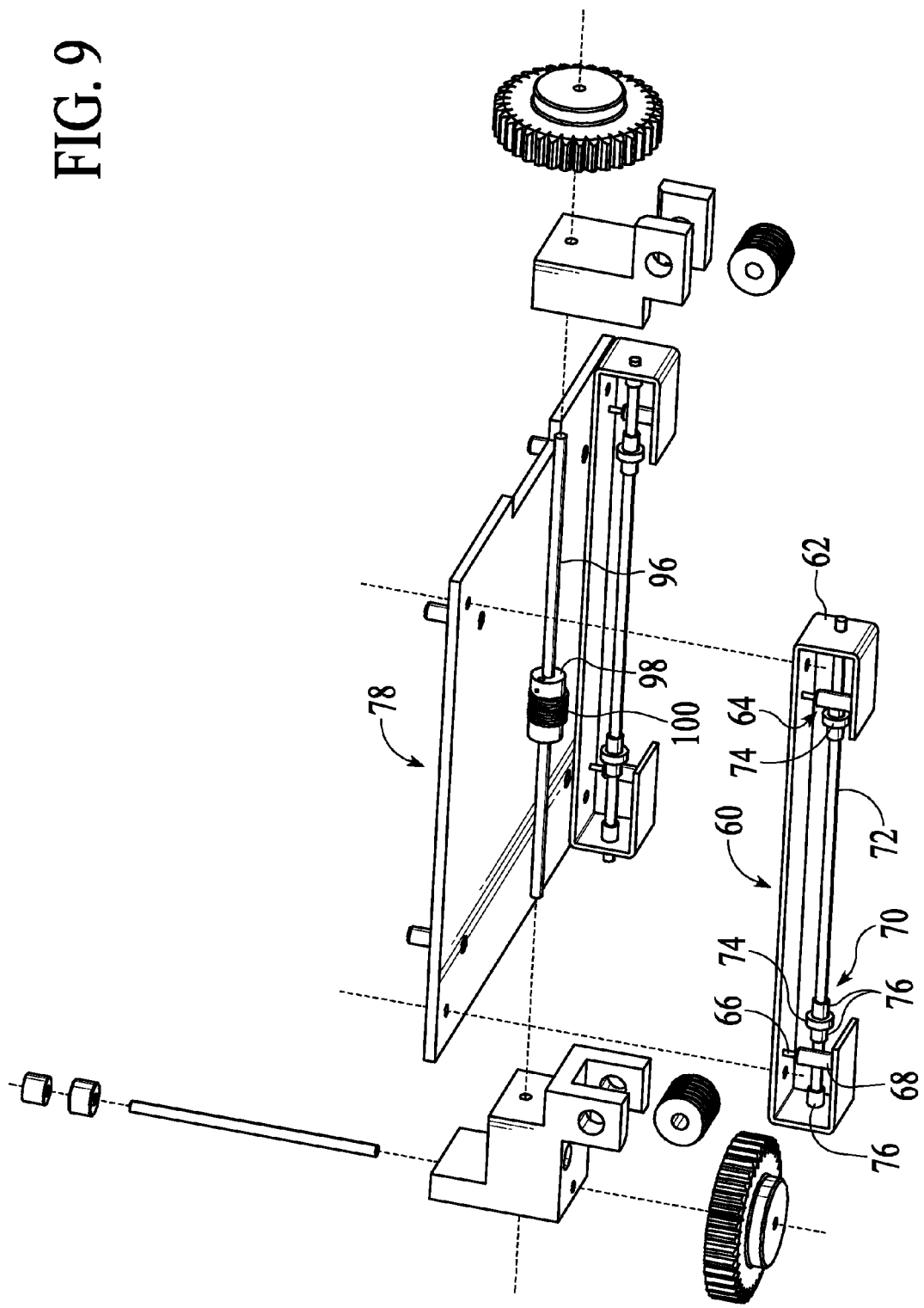
FIG. 9 is a bottom exploded perspective view of a moveable carriage assembly and its features.
Figure 10:
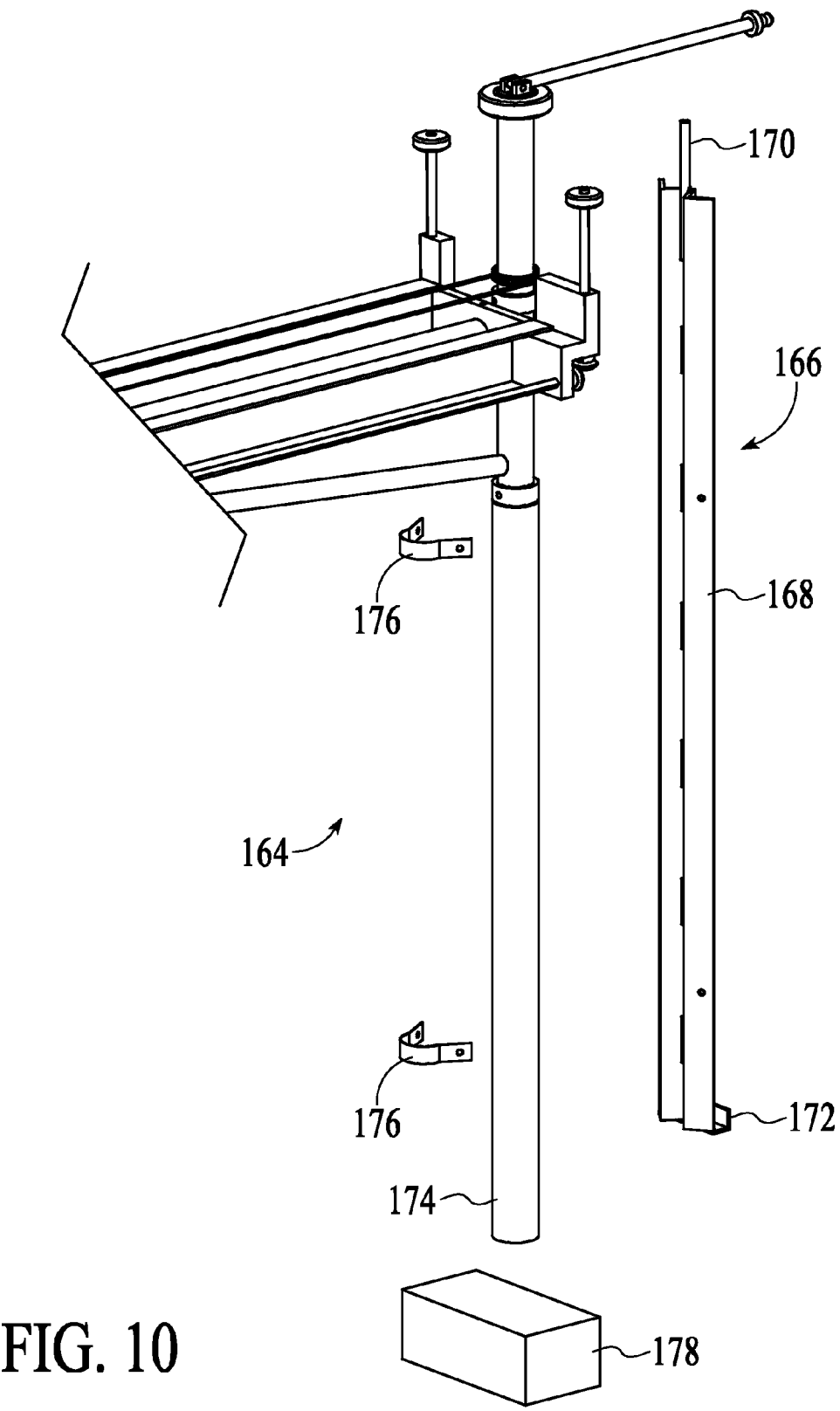
FIG. 10 is a partial exploded view of an extended positioning system showing a wall mount system.

Referring to FIGS. 4, 6, and 9, a moveable carriage 58 slides or rolls along the structural extension assembly 34 in a linear movement on vertical load shafts, bearing rollers, and collars assembly 70 to carry (or roll) the box solar oven assembly 180 into optimum locations for operating an embodiment. The moveable carriage 58 is attached to the structural extension assembly 34 by four lateral shafts and rollers assemblies 64 in FIGS. 6 and 9, which keeps the moveable carriage aligned and trapped to prevent any side derailment. Moveable carriage 58 also has two roller brackets 62 with material extending under the U-shaped channel members 36R and 36L flanges in FIG. 6 for interference between channel members flanges and roller brackets 62 when a vertical ascending movement is applied. This prevents upward disengagement from the structural extension assembly 34. These features keep the moveable carriage 58 from being lifted or removed from the structural extension assembly 34 while allowing only a longitudinal degree of freedom movement (linear) of the moveable carriage 58 along the length of the structural extension assembly 34. Further, the moveable carriage 58 is prevented from rolling or sliding off the end of the structural extension assembly 34 by a cable loop pulley mount plate bracket 128, therefore securely trapping the moveable carriage 58 (during assembly) onto the structural extension 34 while in operation.

The moveable carriage 58 in FIGS. 4, 6, 7, 8, and 9 includes a base plate assembly 78 made up of a structural base plate 80 with nesting pins 82 threaded (with machine nuts) or other methods of securing, positioning, and attaching a pedestal base 248 (FIG. 12) of the box solar oven assembly 180 onto the extended positioning system 32 in FIG. 2. Two rollers and carriage retaining assemblies 60 attach to the underside of base plate 80 with screws or a like standard attachment to create the carriage movement mechanism. It provides vertical load shafts 72, and vertical load bearing rollers 74, with rubber press fit retaining vertical load shaft collars 76, for moving or driving the carriage along the structural extension assembly 34. Carriage retaining assembly 60 provides for lateral control using lateral shafts and rollers assembly 64 with lateral roller shaft 66 and lateral rollers 68 guiding the carriage with the edges (FIG. 6) of the U-Shaped channel members 36R and 36L to prevent derailment. Vertical load shafts, bearing rollers, and collars assemblies 70 carry the box solar oven assembly 180 weight along the structural extension assembly 34. The roller bracket 62 is sized and configured to provide interference with the U-shaped channel rail members 36R and 36L as stated earlier to prevent detachment and removal from the structural extension assembly 34.

Referring to FIGS. 2, 3, 11, 12, and 13 the box solar oven assembly 180 includes an insulated assembled foam box 182 (FIG. 13) which includes a foam box top 184, foam box sides 186R and 186L with clearance holes for the stationary horizontal pivot bearing bolts 234 supported by a yoke member 228, and a foam box bottom 188 assembled at all the corner joints with long wood screws or other suitable connecting methods. The foam material used is rigid polyisocyanurate Aluminum foil faced foam board used in building construction. Energy Shield® by Atlas Roofing Corporation®, or Thermasheath and TSX 100 and 200, by Rmax Inc., or other standard building foam with two sided foil can be used for the insulated foam box 182 structure. It can be any standard thickness 1.5 inches or greater.

A formed sheet metal hoop strap 192 assembles around (slides onto) the foam box main body area and is then secured by tightening the two screws at a hoop clamp opening (FIG. 2 under bottom collector panel). The clamping system includes two parallel flanges bent 90 degrees outward at each end of the hoop strap material with two clearance holes with screws in each for tightening the clamp together. The clamping system is tightened until it cinches (clamps) tight therefore providing a hoop stress compression force strength around the entire main body of the insulated foam box structure. This hoop strap 192 provides a significant strength improvement to the foam box structure 182 without adding excessive weight or requiring other less desirable methods for structural integrity and strength. There are two holes located in the hoop strap 192 for flange bearings 194 (FIG. 13) to be inserted which are for rotating the box solar oven 180 (FIG. 12) on the stationary horizontal pivot bearing bolts 234 supported by the yoke member 228. The hoop strap 192 depth is larger (wider) than the top width of the foam box top 184 therefore creating a recessed well at the front glazier opening having a depth of the thickness of the stacked two glaziers 196 of clear plate glass or equivalent with the glazier spacer frame 198 in between. This recessed well provides for insertion, at the front of the insulated foam box 182 edge face, for secure placement in two degrees of freedom of the inner and outer glaziers 196 and glazier spacer frame 198 assemblage. A tight seal for heat retention of the inner glazier 196 to the foam box edge along with the glazier spacer frame 198 between both the inner and outer glaziers 196 is made with a solar collector panel mount retainer and insulating enclosure frame assembly 202 (FIG. 13) by using a solar collector panel mount retainer and insulating enclosure frame 204, which retains and traps the glazier system securely and tightly in place down into the recess well and onto the foam surface when slid on over the hoop strap's 192 outer surface down to the outer glazier surface. The insulating enclosure frame 204 is then secured with sheet metal screws (not shown) into the hoop strap 192 on both side ends. A solar collector panels assembly 208 made up of solar collector panels 210 segments is assembled by inserting the lower flanges of the solar collector panels 210 under the solar collector panel mount retainer and insulating enclosure frame 204 opening flanges before assembling the insulating enclosure frame assembly 202 onto the hoop strap 192. The solar collector panel mount retainer and insulating enclosure frame 204 after attachment, is what holds the glazier and solar collector panel systems securely in place by using the hoop strap 192 main structure.

A formed sheet metal cover protector assembly 212 provides exterior protection of the foam material not covered by the hoop strap 192. A cover protector 214 is inserted onto the insulated foam box 182 with its sides passing over the hoop strap 192 material and when in position the cover protector 214 is then secured with sheet metal screws (not shown) into each side to the hoop strap 192 structure. A door assembly 218 slides into the rear opening of the insulated foam box snugly with a degree of interference for heat retention using a door handle 222. An added appropriate surface of plastic or other suitable material (not shown) can be inserted into the assembled foam box 182 on the foam/foil surfaces if desired to protect and insulate to facilitate and accommodate operation wear and cleaning.

Figure 3:
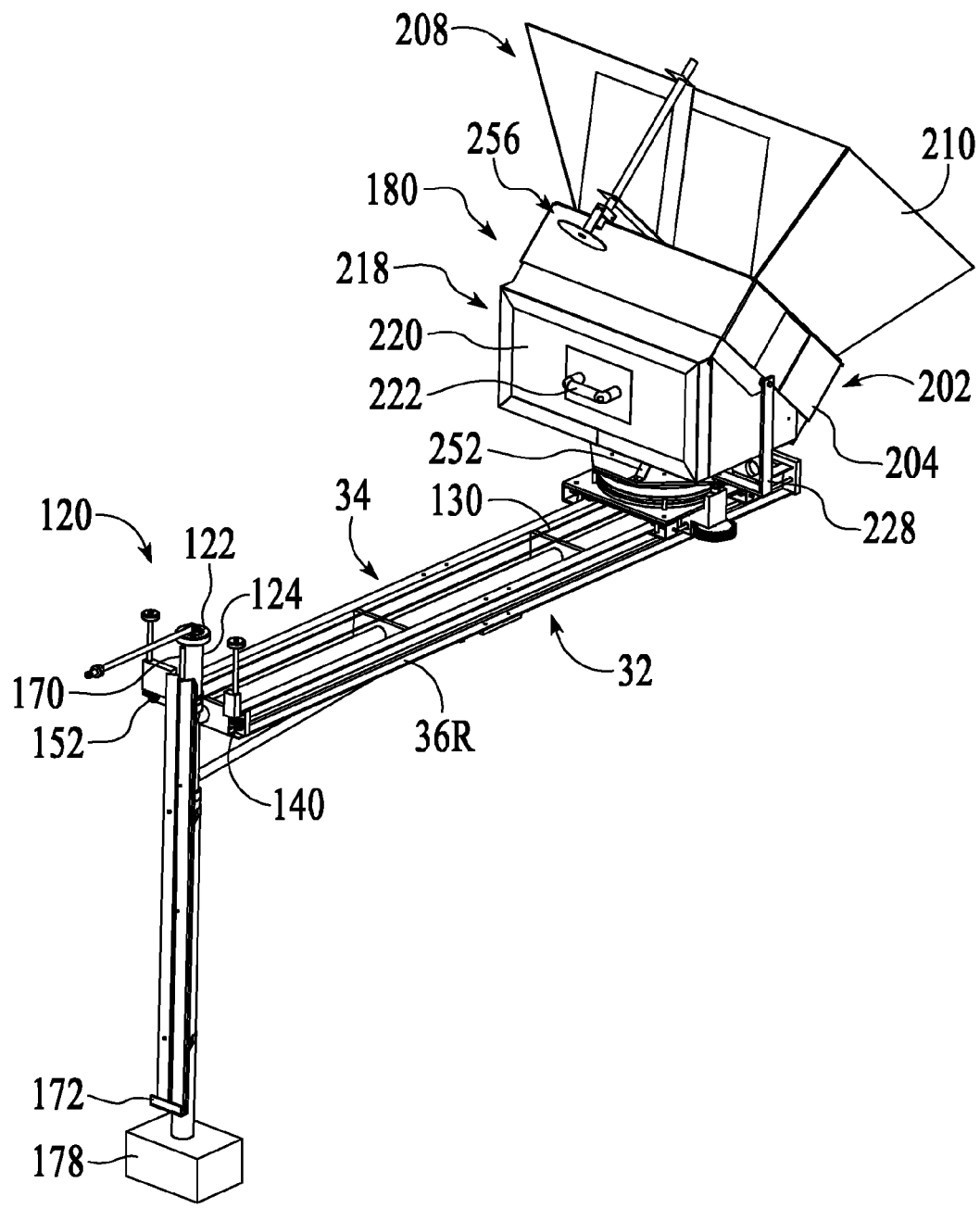
FIG. 3 is a rear perspective view of the solar oven system in accordance with an embodiment.
Figure 11:
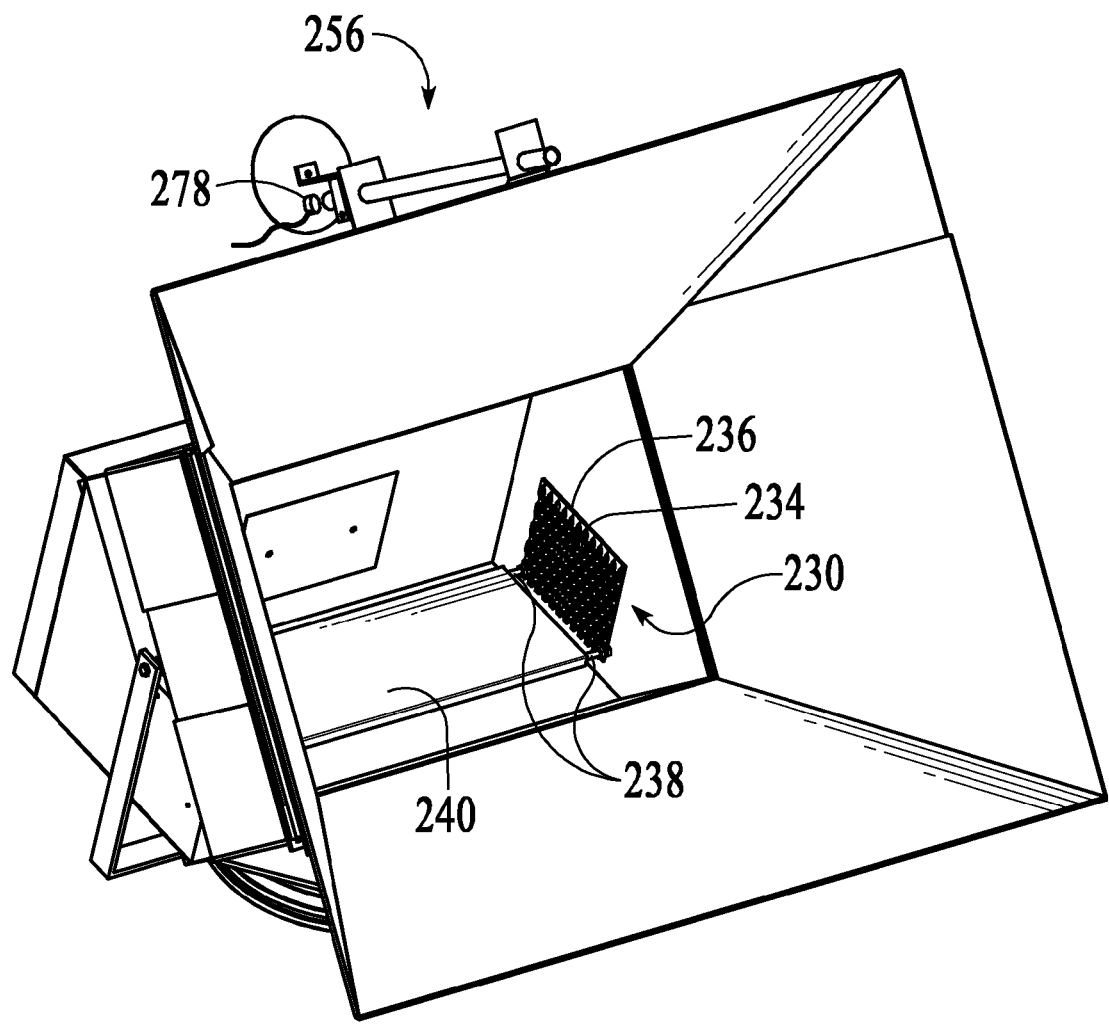
FIG. 11 is a front perspective view without glaziers of a box solar oven assembly in accordance with an embodiment inside an oven area including a food rack and supports assembly.
Figure 13:
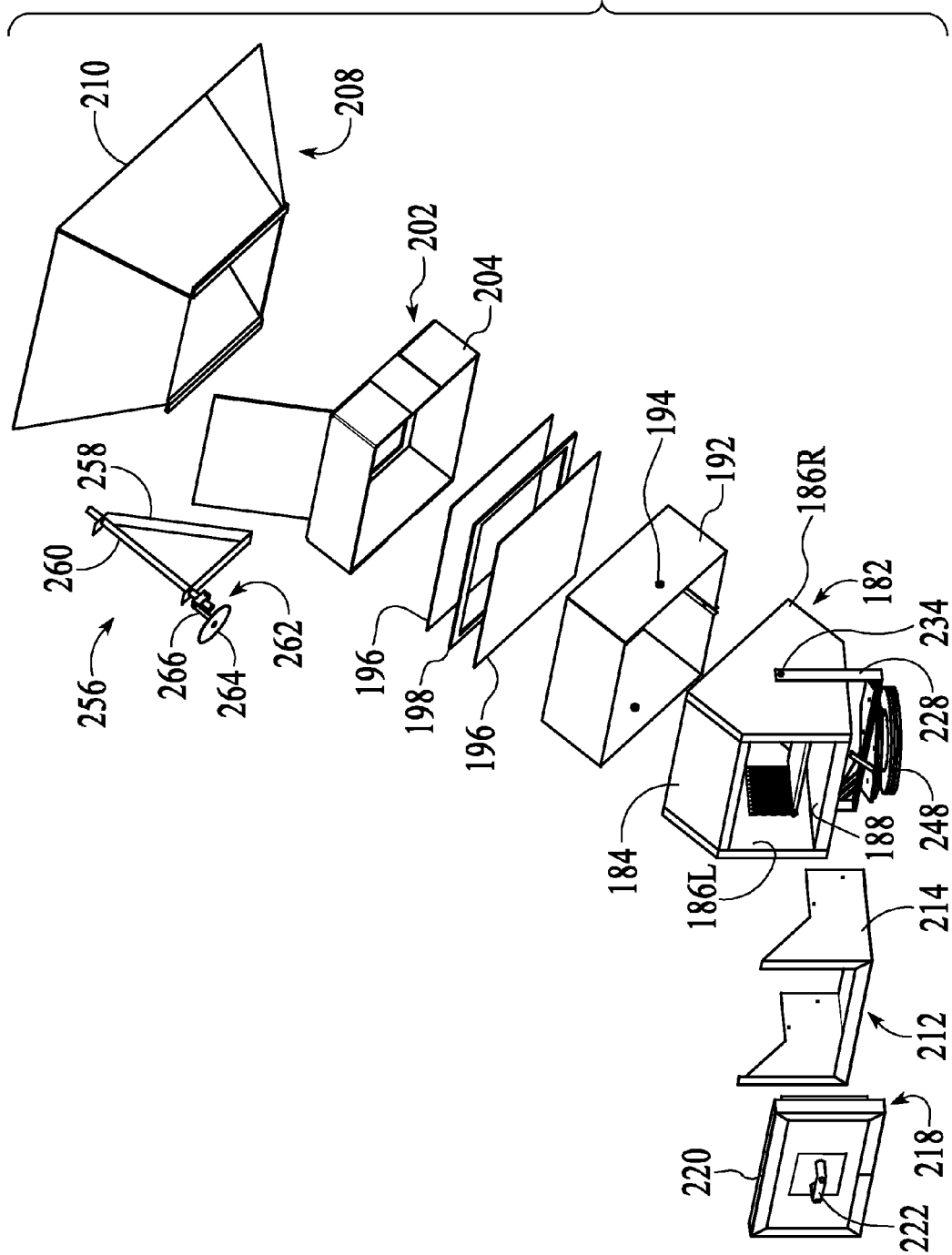
FIG. 13 is a partial exploded view of a box solar oven assembly side view without exploding an azimuth bearing and pedestal base assembly.

Referring to FIGS. 3, 11, and 13, A light alignment indicator assembly 256 is used to indicate azimuth and solar altitude alignment of the box solar oven assembly 180 with respect to the related perpendicularity of the glazier surface to the sun's incoming rays. It includes a tube scope box mounting bracket 258 which positions and mounts a light indicator tube 260 attached with clamping collars (not shown) or other method around the tube at the mounting bracket surfaces with the light indicator tube 260 positioned perpendicular to the glazier surface in two directions. A translucent light target assembly 262 provides for a translucent target 264 to be parallel and away from the tube 260 end plane FIG. 13). The translucent light target assembly 262 includes a clamp type target mounting bracket 266 which connects or clamps onto the light indicator tube 260 extending past the light indicator tube 260 end to position the translucent target 264 parallel and away from the tube 260 end plane needed for projecting the sun rays (light beam) out of the tube onto the translucent target 264 for visual reading on either surface of the target material (front or back). The light alignment indicator assembly 256 is attached with the tube scope mounting bracket 258 into the box solar oven assembly 180 solar collector panel mount retainer and insulating enclosure frame assembly 202 with screws.

Figure 12:
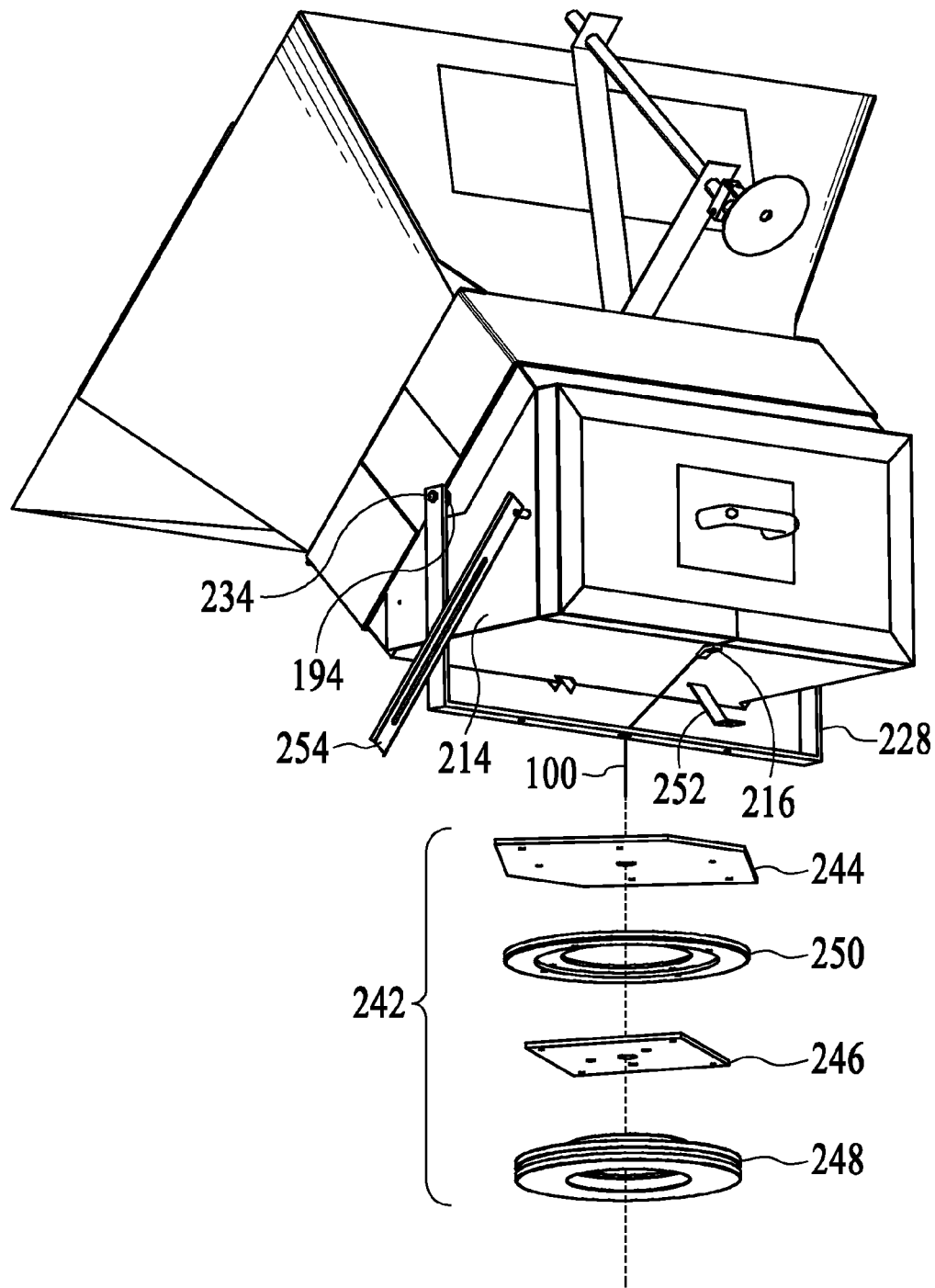
FIG. 12 is a rear view perspective of a box solar oven assembly with an azimuth bearing and pedestal base assembly exploded in this view in accordance with an embodiment.

Referring to FIG. 12, an azimuth bearing and pedestal base assembly 242 for positioning and rotating the box solar oven assembly 180 includes a pedestal base 248 providing a stable ballast stand frame structure screwed or connected by other standard methods to an azimuth 12 inch bearing bottom mount plate 246, then is connected to an azimuth 12 inch bearing 250, which is then mounted to an azimuth 12 inch bearing top mount plate 244 which provides a mounting surface to connect to the yoke member 228. A center of gravity biaser spring 252, screwed and mounted to the plate 244 surface is provided to keep a solar altitude cable winch cable 100 tight at all times and therefore fully operational at any position in the 90 degree rotation range. The center of gravity biaser spring 252 is designed to keep a constant force or biased push on the box solar oven assembly 180 in one direction throughout the entire adjustment range, thereby eliminating a characteristic reverse rotating reaction caused by a change in the center of gravity moment due to the unique box solar oven 180 design shape.

A solar altitude locking bar 254 in FIG. 12 is connected with a pivoting screw at one end onto the box solar oven assembly 180 and to the yoke member 228 with its adjusting slot. This provides for solar altitude locking bar 254 being able to slide in a long slot at the yoke member 228 when the box solar oven assembly 180 is rotated. By tightening a locking finger screw (not shown) in the long bar slot at the yoke member 228, a clamping action of the bar to the yoke member occurs, therefore locking the box solar oven assembly 180 into a set position. This is used for manually locking the rotating altitude position when needed during manual operations, handling, or maintenance.

FIG. 11 shows a food rack and supports assembly 230 inside the box solar oven assembly 180. The food rack and supports assembly 230 includes two horizontal pivot bearing bolts 234 supported by the yoke member 228 (FIG. 12) as discussed earlier. These bolts are mounted stationary to the yoke member 228 with machine nuts and protrude through the flange bearing assembly and out into the box solar oven assembly 180 cooking or heating interior compartment for assembling the food rack and supports assembly 230. Two food rack side plates 236 are rigidly connected with machine nuts to the two horizontal pivot bearing bolts 234. Two food rack cross rods 238 are rigidly connected with machine nuts at each corner of the lower portion of two food rack side plates 236. A food rack horizontal plate 240 then sits on top the two food rack cross rods 238 maintaining its position vertically by its own weight. The food rack horizontal plate 240 has the two longitudinal side edges bent 90 degrees down or can have four leg type features extending or protruding from the bottom surface of the plate for trapping the plate itself onto (straddling) the two food rack cross rods 238 when in operation. Horizontal plate 240 is trapped (secured) between the two food rack side plates 236 and each of the outer diameter sides of the two food rack cross rods 238.

Referring to FIGS. 2, 3, 4 and 5, the extended positioning system 32 includes a remote control mechanism and devices 120 (FIG. 2). Remote control mechanism and devices 120 is designed to operate for position, adjusting, and solar alignment in any infinite continuous location or position along the extended positioning system 32 with the operator located within the building structure.

A linear positioning mechanism used to position the box solar oven assembly 180 along the extended positioning system 32 includes and referring to FIGS. 3, 4 and 5, is a linear hand wheel 122 attached with a set screw or other standard method to a cable drive spool 124 which is then slip fit over the vertical pivoting member 42 for rotation of the cable drive spool 124 when in use. A cable drive spool collar 56 attached with a retaining screw to the vertical pivoting member 42 provides a thrust bearing surface for the turning spool 124 to run and slide on thereby reducing friction when rotating while also simultaneously setting the position of cable drive spool 124 on the assembly. A carriage drive cable 130 wraps a series of turns around the cable drive spool 124 in a tight fashion therefore providing frictional attachment to pull all the weight of the box solar oven assembly 180 on moveable carriage 58 in either linear direction without slippage. One end of the carriage drive cable 130 is attached or connected with clamps or a hook method to the vertical load shaft 72 (FIG. 9) closest to the cable drive spool 124 of the moveable carriage 58. The second end of the carriage drive cable 130 passes under the moveable carriage 58 and out the other side and down the structural extension assembly 34 to the end where cable loop pulley 126 is mounted onto the structural extension assembly 34 end with cable loop pulley mount plate bracket 128 by conventional methods and is looped around the cable loop pulley 126 to return to the second vertical load shaft 72 for again attachment to the moveable carriage 58. This system provides pulling tension of the cable for either direction of movement of moveable carriage 58 when the cable drive spool 124 is rotated in either direction.

An extendable lever handle 156 mechanism is used by the operator for polar angular rotation positioning of the extended positioning system 32. Referring to FIGS. 2, 4, and 5, this control mechanism includes an extendable lever handle 156 with a set screw attached access knob positioning collar 158 at the user end. The other end of extendable lever handle 156 is assembled with a pivot pin into a sliding drive block pivot yoke 160 providing for the extendable lever handle 156 to be pivoted (or rotated) 90 degrees from horizontal to vertical or vise versa when in use. The sliding drive block pivot yoke 160 fits and is assembled into a wrench drive plug 162 and after insertion a press fit retaining pin (not shown) is put into the sliding drive block pivot yoke 160 block body which captures the yoke 160 into the wrench drive plug 162. Then wrench drive plug 162 is then mounted and attached using two blind, screw tapped holes with set screws which are inserted through clearance holes in the diameter of the vertical pivoting member 42 of the pivot weldment 40 at the top and tightened into the wrench drive plug 162 thereby securing them together.

Referring to FIGS. 2, 4, 6 and 7, an azimuth positioning remote control mechanism includes an azimuth hand wheel and hand wheel drive shaft assembly 132, an azimuth worm gear drive mechanism 104, an azimuth bearing drive roller assembly 102, and an azimuth 12 inch bearing 250 (FIG. 12).

The azimuth hand wheel and hand wheel drive shaft assembly 132 includes the azimuth hand wheel 134 attached with a retaining screw to an azimuth hand wheel drive shaft 136 which extends down through a running slip fit clearance hole in the top of an azimuth miter gear drive shaft bracket 138 interconnecting with a first azimuth miter gear 140 which engages a second miter gear 140 therefore together changing the rotating power direction 90 degrees from vertical to horizontal. The second azimuth miter gear 140 is connected to a special azimuth D-profile drive shaft 142 that then runs the entire length of the structural extension assembly 34. The azimuth D-profile drive shaft 142 is mounted in running slip fit bearing clearance holes at each end at the bottom of the azimuth miter gear drive shaft bracket 138 and at the cable loop pulley mount plate bracket 128 to allow for power transfer rotation using the bearing holes. The miter gears 140 are fixed to the shafts with set screws or other mechanical common methods.

The azimuth worm gear drive mechanism 104 has a worm 106 that is mounted with it's bore onto the D-profile drive shaft 142 with a running slip fit bearing clearance so it slides along the D-profile drive shaft 142 when the moveable carriage 58 is driven linearly with the cable drive spool 124. The bore of the worm is configured to either have a flat spot or keyed feature in the diameter, or a mechanical clip method (not shown) on it's hub to provide a key type feature that prevents the worm from rotating around the D-profile shape of shaft 142 when rotational force is applied, yet still allowing free sliding longitudinally along the D-profile drive shaft 142. The design transfers the rotating power from the D-profile drive shaft 142 to the worm at any location along the extended positioning system 32. The rotating azimuth worm 106 engages an azimuth worm gear 108 which is connected to a drive roller shaft 114 and is passed through a running slip fit bearing clearance hole in an azimuth worm gear housing 110 (FIG. 8) that is machine screwed or attached by other common methods to the base plate 80 of the moveable carriage 58. A drive roller collar 118 secures and positions the azimuth worm gear 108 and drive roller shaft 114 together to the azimuth worm 106. A Drive roller 116 is attached in a secure standard method to the top of the drive roller shaft 114 to transfer the rotating power to the side edge of azimuth 12 inch bearing 250 (FIG. 12) and rotate the box solar oven assembly 180 for azimuth positioning and adjustments. At the interface between drive roller 116 and the side edge of azimuth 12 inch bearing 250, pressure is applied into the edge of the side edge of azimuth 12 inch bearing 250 with enough force to provide friction to drive the system. The force of the drive roller 116 may be achieved by various design methods including using a rubber roller preloaded at the side edge of azimuth 12 inch bearing 250 by setup adjustment of the azimuth worm gear housing 110 to the base plate 80 of the moveable carriage 58. Another design method (not shown) is to wedge shape the drive roller 116 in a downward fashion to jam (or wedge) the drive roller 116 into and against the side edge of the azimuth 12 inch bearing 250 using the downward force of gravity and/or another collar (not shown) to preset the downward wedge force in preloading setup. The rotational power can now be transferred from the operator's hand (azimuth hand wheel 134) to the azimuth 12 inch bearing 250 on the moveable carriage 58, at any location along the entire extended positioning system 32 distance.

Referring to FIGS. 2, 4, 5, 6, 7, 8, and 9, the solar altitude positioning control mechanism includes a solar altitude hand wheel and hand wheel drive shaft assembly 144 (shown in FIG. 2), a solar altitude worm gear drive mechanism 86, a cable winch drum and shaft assembly 94 and a cable winch cable 100 which is attached to a solar altitude cable attach bracket 216 (FIG. 12).

The solar altitude hand wheel and hand wheel drive shaft assembly 144 includes a solar altitude hand wheel 146 attached with a retaining screw to a solar altitude hand wheel drive shaft 148 which extends down through a running slip fit clearance hole in the top of a solar altitude miter gear drive shaft bracket 150 interconnecting with a first solar altitude miter gear 152 which engages a second miter gear 152 therefore together changing the rotating power direction 90 degrees from vertical to horizontal. The second solar altitude miter gear 152 is connected to a special solar altitude D-profile drive shaft 154 that runs the entire length of the structural extension assembly 34. The solar altitude D-profile drive shaft 154 is mounted in running slip fit bearing clearance holes at each end at the bottom of the solar altitude miter gear drive shaft bracket 150 and at the cable loop pulley mount plate bracket 128 to allow for power transfer rotation using the bearing holes. The miter gears 152 are fixed to the shafts with set screws or other mechanical common methods.

Figure 8:
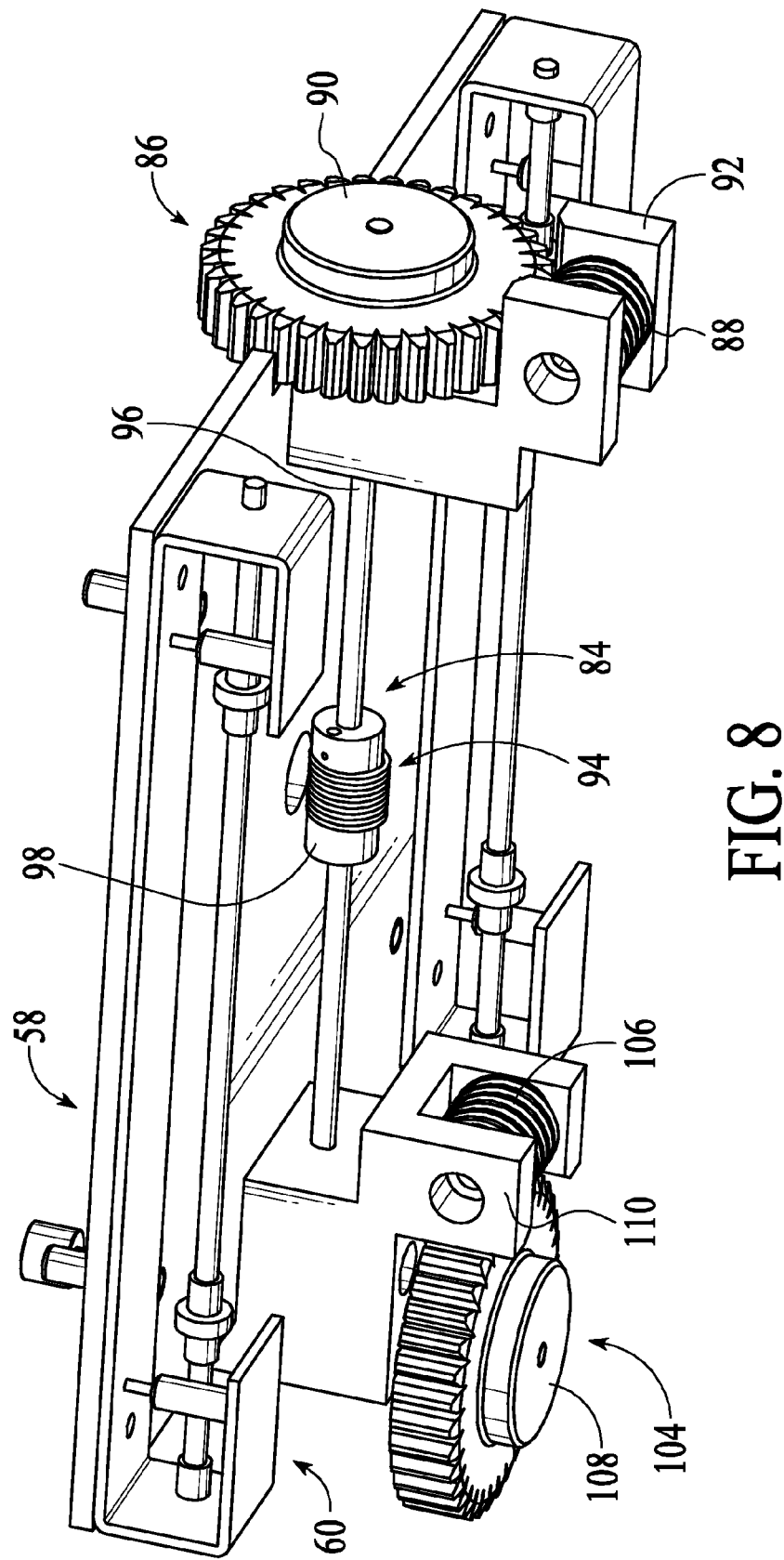
FIG. 8 is a bottom perspective view of a moveable carriage assembly features.

The solar altitude worm gear drive mechanism 86 has a worm 88 that is mounted with it's bore onto the D-profile drive shaft 154 with a running slip fit bearing clearance so it slides along the D-profile drive shaft 154 when the moveable carriage 58 is driven linearly with the cable drive spool 124. The bore of the worm is configured to either have a flat spot or keyed feature in the diameter, or a mechanical clip method (not shown) on it's hub to provide a key type feature that prevents the worm from rotating around the D-profile shape of shaft 154 when rotational force is applied, yet still allowing free sliding longitudinally along the D-profile drive shaft 154. The design transfers the rotating power from the D-profile drive shaft 154 to the worm at any location along the extended positioning system 32. The rotating solar altitude worm 88 engages a solar altitude worm gear 90 which is connected to a cable winch shaft 96 which is passed through a running slip fit bearing clearance hole in a solar altitude worm gear housing 92 that is machine screwed or attached by other common methods to the base plate 80 of the moveable carriage 58. The cable winch shaft 96 is also passed through a running slip fit bearing clearance hole in the azimuth worm gear housing 110 that is machine screwed or attached by other common methods to the base plate 80 of the moveable carriage 58 (FIG. 8). A cable winch shaft 96 retaining collar, where the cable winch shaft 96 passes through the solar altitude worm gear housing 92 (not shown) secures and positions the solar altitude worm gear 90 and cable winch shaft 96 together to the solar altitude worm 88.

Referring to FIGS. 9 and 12, a cable winch drum 98 is attached in a secure standard method to the cable winch shaft 96 to transfer the rotating power to a linear pull of the solar altitude cable winch cable 100, which then pulls to rotate the box solar oven assembly 180 for solar altitude positioning and adjustments. The solar altitude cable winch cable 100 is attached to the cable winch drum 98 with a set screw clamping design consisting of a tapped machine thread hole at the end of the drum intersecting a cable retention hole therefore being able to trap the cable securely to the drum.

The solar altitude cable winch cable 100 is wrapped around the cable winch drum 98 as many times as needed to provide enough linear cable length to rotate the box solar oven assembly 180 in any position within 90 degrees from horizontal to vertical for all possible operation applications. Solar altitude cable winch cable 100 then passes through the moveable carriage base plate 80, up through the azimuth bearing and pedestal base assembly 242, and attaches to the underside of the box solar oven assembly 180 at the solar altitude cable attach bracket 216 which is attached with screws to the cover protector 214 again with a set screw clamping design consisting of a tapped machine thread hole intersecting a cable retention hole for clamping the cable end securely into the solar altitude cable attach bracket 216. The rotational power can now be transferred from the operator's hand (solar altitude hand wheel 146) to the box solar oven assembly 180 at the solar altitude cable attach bracket 216 for rotation even when the moveable carriage 58 is at any location along the entire extended positioning system 32 distance. Furthermore, in this design, when the box solar oven assembly 180 is rotated with the azimuth control, the solar altitude cable winch cable 100 can flex and twist from the drum to the cable attach bracket 216 for the required flexibility needed to position the azimuth simultaneously with solar altitude ranging from less than 90 degrees to greater than 270 degrees of azimuth rotation positions.

Referring to FIG. 1, a protective storage shelter cover 268 is mounted to the side of the opening on the building above the height of the box solar oven assembly 180 with standard fastening methods. The box solar oven assembly 180 is manipulated with the extended positioning system 32 under the protective storage shelter cover 268 for storage until later use.

Figure 14:
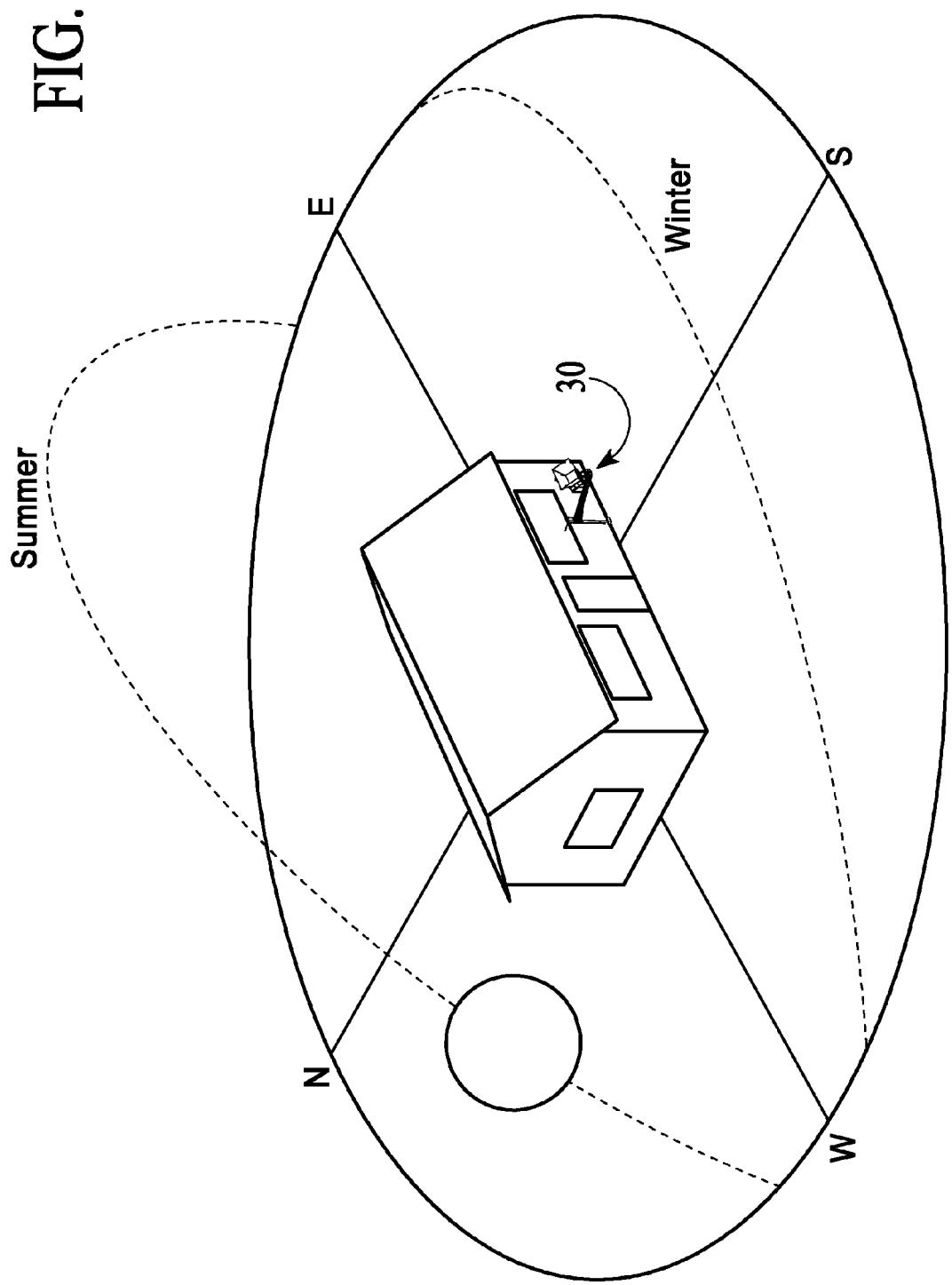
FIG. 14 is a pictorial sketch showing a sun path with respect to a solar oven mounted in position onto a building structure.
Figure 15:
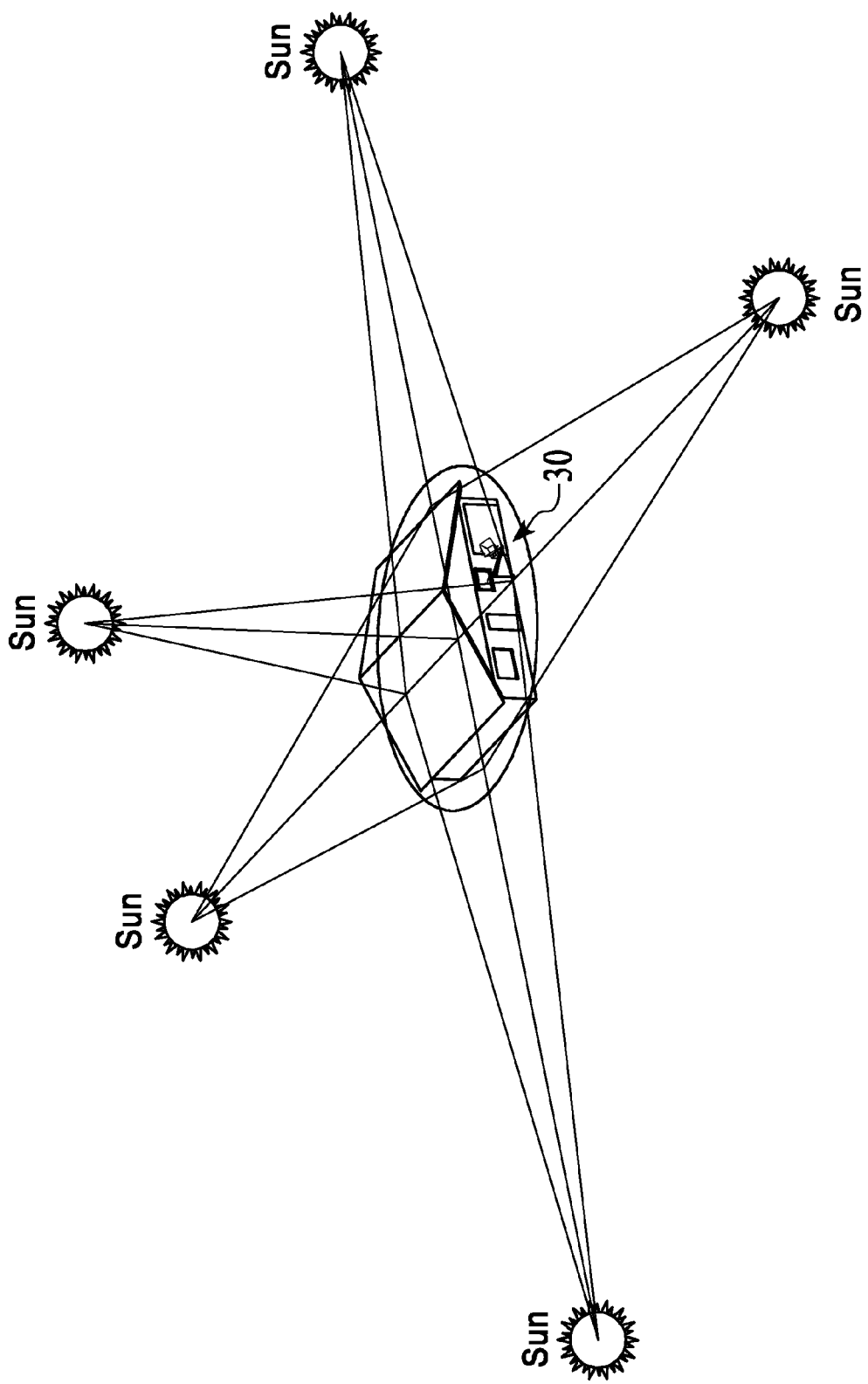
FIG. 15 is a pictorial sketch showing a potential reach for solar energy retrieval of solar energy around corners and past roof eaves.
Figure 16:
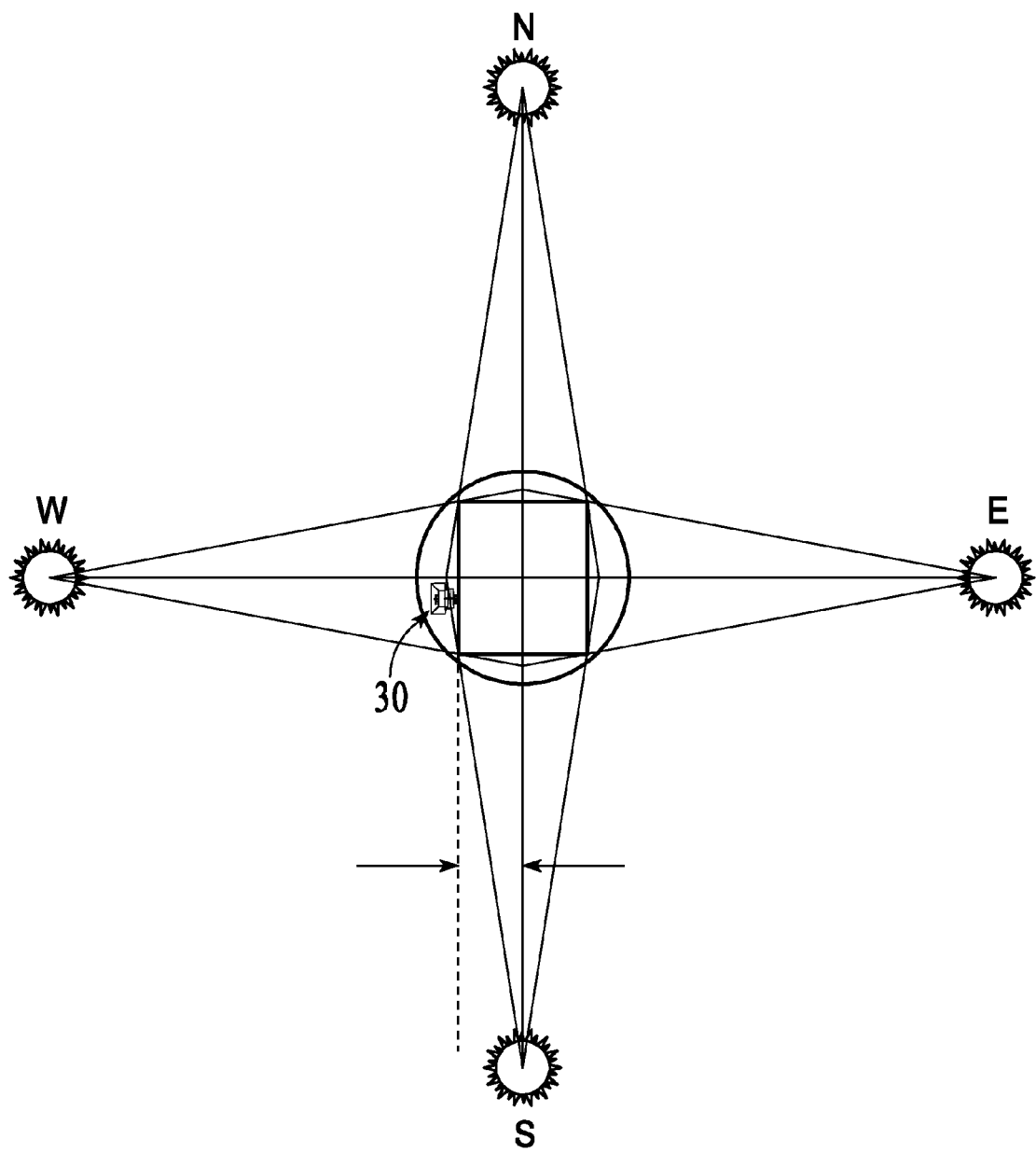
FIG. 16 is a top view sketch showing a potential reach for solar energy retrieval around corners and past roof eaves increasing exposure times with multiple direction installation.

Referring to FIGS. 14, 15, and 16, these diagrams illustrate and indicate the relative increased reach capabilities provided by the new solar oven system 30 embodiment to retrieve solar exposure around a general building structure. FIG. 14 shows the solar oven system 30 extending out in order to meet both summer and winter sun paths which eliminates shadowing from the building overhang and corners. FIGS. 15 and 16, show the potential angular projections of solar radiation exposure in perspective and top views. These views indicate how, in varied application directions, the system 30 can reach back (around a building corner) approximately 11 degrees at a 6 ft extension of the extended positioning system 32 for increased solar exposure time and thus accommodate more varied building directions and geographic locations for universal utility. FIG. 16 shows how an east or west solar oven system 30 application can get increased solar exposure time due to reach back around a building corner.

The solar oven system operates as follows. The operator opens the building opening from the kitchen cooking area and reaches to operate the system with remote control mechanism and devices 120 at the opening bottom edge and retrieves the solar oven system 30 from protective storage for use (FIG. 2).

The extendable lever handle 156 end access knob being held in an accessible location with an access knob positioning collar 158, is pulled vertically straight up fully out of the pivot weldment 40 and then the extendable lever handle 156 is rotated 90 degrees in the sliding drive block pivot yoke 160 into the horizontal position for use as shown in FIG. 2. The extendable lever handle 156 is then pulled or pushed sideways left to right, to provide pivoting torque transmitted through the sliding drive block pivot yoke 160 into the wrench drive plug 162 to the pivot weldment 40 by the user which then rotates the extended positioning system 32, made up generally of the pivot weldment 40, structural extension assembly 34, moveable carriage 58, along with the box solar oven assembly 180. This moves the solar oven system 30 out of protective storage, away from, and perpendicular to the building wall, in front of the opening for cooking use as in the position shown in FIG. 2. The extendable lever handle 156 is then again rotated 90 degrees in the sliding drive block pivot yoke 160 into the vertical position and lowered back down into the pivot weldment 40 putting it into it's original storage position when the access knob positioning collar 158 contacts the wrench drive plug 162 for later use and therefore not interfering with the other operational procedures and features.

Then the two remote control mechanisms and devices 120 for azimuth and solar altitude are used to align the back door surface of the box solar oven assembly 180 to be parallel to the wall opening as in FIG. 2.

The azimuth hand wheel 134 (FIG. 4) and solar altitude hand wheel 146 are rotated individually, each driving it's two drive shafts, azimuth hand wheel drive shaft 136, azimuth D-profile drive shaft 142, solar altitude hand wheel drive shaft 148, and solar altitude D-profile drive shaft 154. The D-profile drive shafts 142 and 154 transmit the rotating power coming through the miter gears 140 and 152 to turn worm gear mechanisms 104 and 86 (FIG. 7), respectively. The azimuth worm 106 turns the azimuth worm gear 108 that turns the drive roller shaft 114 which then turns drive roller 116, thereby turning the azimuth 12 inch bearing 250 for azimuth positioning of the box solar oven assembly 180.

The solar altitude worm 88 (FIG. 8) turns the solar altitude worm gear 90 which turns the cable winch drum and shaft assembly 94, which then, when rotating, pulls the cable winch cable 100 in a linear direction causing the box solar oven assembly 180 to rotate into the desired solar altitude position.

The operator then rotates the linear hand wheel 122 (FIG. 3), therefore turning the cable drive spool 124 and pulling the carriage drive cable 130 which, in turn, moves the box solar oven assembly 180 which is on the moveable carriage 58 and pulls it towards and up to the wall opening ready for use.

The door assembly 218 is then pulled out of the box solar oven assembly 180 and temporarily positioned somewhere in the food preparation area until later use (if a hinged door design is used than this no longer applies). The prepared food containers are then loaded and positioned on the food rack horizontal plate 240 (FIG. 11) being stacked or positioned to the desired liking. The door assembly 218 is then reinserted back into the box solar oven assembly 180, therefore closing the box solar oven 180 for the cooking operation.

Again, rotating the linear hand wheel 122 (FIG. 3) deploys the loaded box solar oven assembly 180 out into the open environment by pulling the moveable carriage 58 out to the end of the extended positioning system 32. The wall mount system 164 (FIG. 2) provides the necessary strength to accommodate the deployed loaded box solar oven assembly 180 out away from the building structure by all vertical load forces directed down in the ground foundation block 178, horizontal loading held in equilibrium by the pivot post 174 and pivot post straps 176, pivot post saddle weldment 166, pivot weldment 40, and beam suspension support truss assembly 48. The azimuth hand wheel 134 (FIG. 4) and solar altitude hand wheel 146 are now rotated again by the operator to align the box solar oven assembly 180 in position (towards the sun) for optimum solar energy retrieval. As the azimuth hand wheel 134 and solar altitude hand wheel 146 are now being rotated, the operator visually uses the light alignment indicator assembly 256 (FIG. 13) and the light beam spot on either side of translucent target 264 to indicate and communicate the amount of azimuth and solar altitude adjustment alignment required for the box solar oven assembly 180 with respect to it's related perpendicularity of the glazier surface to the sun's incoming rays.

Solar cooking is now in full operation without spillage, leaving the kitchen, or other deployment problems associated with the prior art. Now, periodically, the user visually checks and monitors the light alignment indicator assembly 256 translucent target 264 light beam alignment patterns and makes the desired necessary adjustments using the azimuth hand wheel 134 and solar altitude hand wheel 146 keeping the oven system collecting the greatest quantity of solar radiation. The indication of light rays which pass through the light indicator tube onto the translucent target 264 in a full round spot (not round or clipped off) indicates that the box solar oven assembly 180 is accurately aligned to the sun for optimum perpendicularity, therefore, energy retrieval.

As an alternative embodiment (FIG. 6), this manual solar adjustment and alignment process with azimuth hand wheel 134 and solar altitude hand wheel 146 can be configured to be semiautomatic or fully automatic by installing sun tracking devices to the azimuth and solar altitude control mechanisms such as clock motors on each hand wheel, weather spring driven or electric, or other apparatuses to rotate and track the sun path as needed with feed back or no feedback. This tracking would be operated after the above deployment with the manual controls to a sun path start position for the day or cook time.

When the cooking process is completed, the azimuth hand wheel 134 and solar altitude hand wheel 146 are then rotated by the operator to align the back door surface of the box solar oven assembly 180 to be parallel to the wall opening as in FIG. 2. Then the operator again rotates, the linear hand wheel 122, therefore turning the cable drive spool 124 and pulling the carriage drive cable 130 which moves the box solar oven assembly 180 back towards and up to the wall opening ready for unloading. The door assembly 218 is then pulled out of the box solar oven assembly 180 and temporarily positioned somewhere in the food preparation area until later (if a hinged door design is used than this no longer applies). The prepared food containers are then unloaded back into the cooking area by removing them off the food rack horizontal plate 240. The door assembly 218 is then reinserted back into the box solar oven assembly 180, therefore closing the box solar oven 180 for storage.

Then the operator again rotates, the linear hand wheel 122, therefore turning the cable drive spool 124 moving the box solar oven assembly 180 back out away from the building wall and again pulls up extendable lever handle 156 end access knob which is pulled vertically straight up fully out of the pivot weldment 40 and then retracted back down 90 degrees in the sliding drive block pivot yoke 160 into the horizontal position for use pivoting the solar oven system 30 to the protective storage area for later use. The azimuth hand wheel 134 and solar altitude hand wheel 146 may be rotated by the operator to align the box solar oven assembly 180 under the protective storage shelter cover 268 (FIG. 1).

The center of gravity biaser spring 252, screwed to the plate 244 surface, keeps the solar altitude cable winch cable 100 constantly tight throughout the entire 90 degree rotation range when the altitude position is high enough to shift the center of gravity moment in reverse (a geometric characteristic of the oven shape). The center of gravity biaser spring 252 (FIG. 3) pushes on the bottom of the box solar oven assembly 180 upward therefore removing or eliminating the reverse force moment and maintaining the forward force moment (biased in one direction), therefore keeping cable winch cable 100 remaining tight and fully operational in any position without losing control due to cable 100 slack.

The solar altitude locking bar 254 (FIG. 12) is connected with a pivoting screw onto the box solar oven assembly 180 and slides in a slot at the yoke member 228 when the box solar oven assembly 180 is rotated. By tightening a locking finger screw (not shown) in the long solar altitude locking bar 254 slot, a clamping action of the solar altitude locking bar 254 to the yoke member 228 occurs, therefore locking the box solar oven assembly 180 into a set position. This is used for manually locking the rotating altitude position when needed during handling, maintenance, or assembly of the system.

The solar oven system embodiment provides a highly efficient, effective, and adaptive solar oven cooking apparatus that is easy for any one to frequently use as a useful cooking device when doing standard ongoing cooking operations.

Reaching out away from the building structure into the outside environment for solar exposure when operated with remote controls without leaving the cooking area, and the adaptable flexible universality of the system features greatly enhancing practicality and usability, all provide increased significant development of solar oven technology in the prior art, therefore, substantially impacting energy savings, alternative energy use, and energy conservation.

The solar oven system embodiment provides a major advantage of integrating the needed solutions of the various and numerous problems encountered with solar cooking that, up until now were prohibitive to the operating requirements of each step in the entire solar cooking process. It is one complete seamless cohesive operation that has been solved with this new embodiment apparatus by integrating the functional process steps together from a kitchen area.

Featured examples of this new embodiment including the box solar oven structure rotating around the food contents during vertical solar altitude adjustments, all food handling being done in the kitchen area, and the ability to move out and position the box solar oven out away from the building and retrieve it back from inside the building are just three of the major advantages illustrating the practical innovative design of this embodiment.

In addition to the above-described embodiments, many other variations are possible. For example the solar oven system 30 embodiment and or extended positioning system 32 may be used for other food preparation needs such as cooling of hot dishes, making sun tea, drying fruit, drying dishes, or pasteurizing water.

The extended positioning system 32 may be used alone to adapt to and accommodate other portable box solar ovens built or purchased which are unrelated generic types to this solar oven system. If yoke member 228 (FIG. 12) is disconnected from the azimuth 12 inch bearing top mount plate 244, therefore enabling removal of the remainder of the box solar oven assembly 180, then any portable solar oven placed on top of the azimuth 12 inch bearing top mount plate 244, which is connected to the moveable carriage 58, would provide for the operator to be able to use three of the manual remote control mechanisms and devices 120, including the Linear hand wheel 122 for carriage movement, azimuth hand wheel 134 for adjusting azimuth, and the extendable lever handle 156 for polar angular rotation of the structural extension 34. This adaptation provides for expanded use of the described embodiment utilizing a wider range of market adaptations of generic prior art portable box solar ovens which further accelerates solar oven technology in the future.

The extended positioning system 32, with its universal utility including its manipulating and control features, may also provide other wider uses such as photo voltaic solar cell positioning and operation, or other applications requiring extension and reach out away from buildings or other structures.

This embodiment, with its utility, can be adapted and reconfigured at the wall mount by eliminating the ground foundation block 178 loading path for multistory, above ground building and apartment use applications providing access to sunlight to residences and the like for solar cooking operations that would not normally be available to these applications. This further expands the solar oven technology.

Furthermore, the solar oven system 30 may also be used and mounted at any alternative location of the building structure, deck structure, wall, or post for added utility in various adapted settings. This will expand the alternatives available for solar radiation exposure.

Further, the option of creating a new cut wall opening designated solely for this solar oven system 30 provides the added benefit of having the box solar oven assembly 180 protective storage shelter cover 268 over and around the opening for ease and effective storage when pulled back to the building when the unit is not in use (not blocking a window opening when leaving the unit ready for the next use). Also a new designated opening can provide better operator reach into the box solar oven 180 depending upon the interior layout of the cooking area. The protective storage shelter cover 268 can also be installed directly over and around the window opening if desired for ease and speed of the operation regarding the unit storage steps being removed.

Box solar oven assembly 180 can also be used and operated in a stand alone configuration in the described embodiment placed anywhere such as a prior art portable unit and can be aligned by rotating manually then locked into position using the solar altitude locking bar 254 (FIG. 12).

Another variation of an embodiment of the solar oven system 30 would be to have the extended positioning system 32 structural extension assembly 34 lengthened for further reach out into the environment for solar radiation availability providing (if out far enough) approaching 360 degrees of solar exposure. By adding a section to the structural extension assembly 34 or having a telescoping section that extends out from the main structural extension 34, this could be accomplished. Due to the extensive structural extension length, a designed support assembly with wheel casters extending down to the ground or other surface and attached at some intermediate location along the structural extension 34 or at it's end would provide added support for a long structural extension 34 while continuing to provide for movement when making polar angular adjustments of structural extension 34 with the extendable lever handle 156.

Referring to FIG. 12, the azimuth bearing and pedestal base assembly 242 can be changed in various ways to provide alternative ways to accommodate different applications and reduce parts and cost. For example, one alternative is to remove (not have) the pedestal base 248 and azimuth 12 inch bearing bottom mount plate 246 whereby then attaching the azimuth 12 inch bearing 250 directly to the moveable carriage base plate 80. Another is to remove the two top and bottom azimuth 12 inch bearing mount plates 244 and 246 along with the pedestal base 248 and attach the yoke member 228 and moveable carriage base plate 80 directly to the azimuth 12 inch bearing 250 (not removable readily from the extended positioning system 32 and no base for stand alone operation). These configurations reduce the amount of parts and cost of the azimuth bearing and pedestal base assembly 242 which are not necessarily required for some stand alone or other application functions. Or, the pedestal base 248 can be attached directly to the yoke member 228 (no azimuth 12 inch bearing 250 or azimuth function unless a separate bearing is inserted under the pedestal base 248) for a stand alone system (operating without the extended positioning system 32).

Another variation of the solar oven system 30 is that door assembly 218 can include a hinge and latch design at the top or bottom of the door edge to increase and simplify operation efficiency which keeps the door attached at all times to the oven body and speeds up the loading process. Either design of press fit insertion (described in the above description) or hinged attachment can be used depending on cost and process method application requirements.

Different alternative wall mount system design configurations to accommodate various applications include a steel stake retention rod driven into the ground replacing the saddle bottom retaining bracket 172 which was previously employed. This stake retention method includes a horizontal flange (not shown which is welded onto the M-shape saddle 168) protruding from one side of the M-shape saddle 168 near the ground surface with a hole for the insertion and driving of a retention rod driving it deep into the ground material for secure retention of the bottom of the pivot post saddle weldment 166. This design is needed when the building wall design and material do not accommodate the saddle bottom retaining bracket 172 design shown in the preferred embodiment described above. Also, the saddle top retaining stud 170 can be converted to another shape design of a flange with a hole or other for accommodating different building designs. Screws, bolts, other type fasteners, or other standard prior art retaining methods can be used if necessary to attach the pivot post saddle weldment 166 to the wall as well.

The azimuth worm gear drive mechanism 104 (FIG. 7) can be changed to a miter gear 90 degree (no gear reduction) or bevel gear (reduction) alternative design if desired. This provides an alternative for a direct drive gear ratio of one to one in the drive system or other gear reduction ratio to the azimuth 12 inch bearing 250. This reduces the turning revolutions the operator must make to change azimuth position. These designs also allow for cost reduction in manufacture.

Sun tracking clock motors, servo motors (spring force, electric, or other), or other server mechanisms can be mounted and attached to the azimuth and solar altitude hand wheel and hand wheel drive shaft assemblies wheels 132 and 144 (FIG. 2) for driving and turning the remote control devices to track the sun path for automatic adjusting to sun position throughout the day therefore, not requiring operator intervention for the entire cooking time.

The positioning system can include a sun tracking system that utilizes servo motors that adjust positioning of the solar oven radiation collection device. For example, a sun location system can be used to identify current location of the sun, and the servo motors (or other servo mechanisms) can adjust positioning of the solar oven radiation collection device based on information about location of the sun provided by the sun location system.

For example, a market manufactured automated sun tracking system using either a fixed control algorithm, fixed control mechanism, or dynamic tracking system design can be adapted and integrated into the solar oven system 30 (FIG. 2) by attaching automatic sun tracking system components onto the extended positioning system 32 and box solar oven assembly 180. Referring to FIG. 5 and FIG. 6 servomotors 270 and 274 are mounted to the azimuth hand wheel drive shaft 136 and solar altitude hand wheel drive shaft 148 with azimuth servomotor mount bracket 272 and solar altitude servomotor mount bracket 276 with machine screws or other standard attachment methods. The servomotor drive shafts are connected with azimuth servo drive coupling 280 and solar altitude servo drive coupling 282 with set screws to the azimuth and solar altitude hand wheel drive shafts 136 and 148 for driving the azimuth and solar altitude hand wheel & hand wheel drive shaft assemblies 132 and 144 (FIG. 2). The azimuth and solar altitude servomotor mount brackets 272 and 276 are then attached to azimuth miter gear drive shaft bracket 138 and solar altitude miter gear drive shaft bracket 150 (FIG. 6) with machine screws or another standard attachment method to connect and hold the servomotors stationary with respect to the positioning system 32 frame when rotating. A feedback light sensor unit 278 (FIG. 11) mounted on the translucent target 264 (FIG. 13) under the end of the light indicator tube 260 receives light from the light indicator tube when in alignment communicating to the servomechanism to stay in position, or if partial light, adjust to align. This feedback light sensor unit 278 would be used for a dynamic system design requiring a feedback sensor circuit. A solar tracking controller 284 is then connected to the sensor circuit and servomotors for solar tracking control.

Further, servo motors can be employed that position using a GPS (Global Positioning System) control signal from a cell phone or other electronic device. Furthermore, a solar oven system software application on a cell phone could be employed to adjust and monitor temperature and sun alignment by the operator during the cooking process and operations using current telecommunications technology.

Accordingly, the scope of the invention should be determined not by an embodiment (s) illustrated, but by the appended claims and their legal equivalents.

What is claimed is:

1. A solar oven, comprising:
   a radiation collection device;
   a mounting system that mounts the solar oven, the mounting system including an anchored pivot and a bracing system adapted to brace the anchored pivot against a wall of a building; and,
   a radial positioning system attached to the radiation collection device and to the mounting system, the radial position system allowing the radiation collection device to be positioned in a plurality of locations in a radial direction relative to the anchored pivot to allow the radiation collection device to be moved radially toward and radially away from a location where the anchored pivot is braced to the wall of the building, the radial positioning system including:
      a structural extension assembly extending radially out from the anchored pivot, the structural extension assembly including two channel rail members and cross members that connect together the two channel rail members,
      a moveable carriage that travels along the two channel rail members, and
      a cable system that controls location of the moveable carriage along the two channel rail members;
   wherein the radiation collection device is mounted on the moveable carriage so that a radial distance from the anchored pivot to the moveable carriage is varied and controlled by the cable system allowing the radiation collection device to be drawn in radial direction closer to the building when loading food into the radiation collection device and allowing the radiation collection device to be moved in a radial direction away from the building when seeking sunlight unobstructed by the building.

2. A solar oven as in claim 1, wherein the cable system includes:
a cable; and,
a hand wheel connected to the cable and located near the anchored pivot, wherein the hand wheel and cable are configured so a user turning the hand wheel moves the cable causing the moveable carriage to move to or away from the anchored pivot.

3. A solar oven as in claim 1:
wherein the moveable carriage includes a pedestal base on which the radiation collector is mounted, the pedestal base being mounted on a pivot around which the pedestal base can be rotated; and
wherein the structural extension assembly includes a drive shaft that runs the length of the structural extension assembly and an adjust control located near the anchored pivot; and,
wherein the pedestal base, the drive shaft and the adjust control are configured so that irrespective of a location of the moveable carriage on the structural extension assembly, as a user turns the adjust control, the drive shaft rotates which causes the pedestal base to rotate around the pivot.

4. A solar oven as in claim 1:
wherein the moveable carriage includes a carriage altitude gear and winch mechanism that rotates the radiation collector to face more upward or more downward;
wherein the structural extension assembly includes a drive shaft that runs the length of the structural extension assembly and an adjust control located near the anchored pivot; and,
wherein the carriage altitude gear and winch mechanism, the drive shaft and the adjust control are configured so that irrespective of a location of the moveable carriage on the structural extension assembly, as a user turns the adjust control, the drive shaft rotates which causes the carriage altitude gear and winch mechanism to rotate the radiation collector to face more upward or more downward without rotating a food rack on which food is placed.

5. A solar oven as in claim 1 wherein the radiation collection device comprises:
a yoke member;
an insulated foam box structure;
a hoop strap placed around the insulated foam box structure that provides structural support to the yoke member;
a food rack plate mounted within the yoke member, the insulated foam box structure and the hoop strap rotating around the food rack plate during solar altitude changes to position the insulated foam box structure;
light alignment indicator that indicates alignment of radiation collection device to solar rays, light alignment indicator including:
a light indicator tube that passes a beam of light onto and through a visible translucent target to indicate alignment in a plurality of positions of the radiation collection device; and,
a control system that locates and positions the radiation collection device in the plurality of positions.

6. A solar oven as in claim 1, wherein mounting system additionally includes:
a support foundation from which the anchored pivot extends, and
a wall anchor that is configured to hold the anchored pivot against the wall of the building.

7. A solar oven as in claim 1, additionally comprising:
a control system that comprises:
an azimuth positioning control mechanism that rotates the radiation collection device for solar azimuth positioning of the solar oven radiation collection device,
a solar altitude positioning control mechanism that rotates the radiation collection device for solar altitude positioning and adjustments,
a lever handle used for polar angular rotation positioning of the structural extension assembly around the anchored pivot.

8. A solar oven as in claim 1, wherein mounting system additionally includes:
a support foundation from which the anchored pivot extends, and
a wall anchor that is configured to hold the anchored pivot against the wall of the building, the wall mount system being additionally configured so that all vertical load forces exerted by the positioning system are directed down onto a ground area and not to the wall of the building.

9. A solar oven as in claim 1 additionally comprising:
a control system that comprises:
a solar altitude positioning control mechanism that rotates the radiation collection device for solar altitude positioning and adjustments.

10. A solar oven as in claim 1, additionally comprising:
a control system that comprises:
an azimuth positioning control mechanism that rotates the radiation collection device for solar azimuth positioning of the radiation collection device, and
a solar altitude positioning control mechanism that rotates the radiation collection device for solar altitude positioning and adjustments.

11. A solar oven as in claim 1 wherein the positioning system is configured to move the radiation collection device from where an operator inside the building loads the radiation collection device, to an open area environment away from the building where the radiation collection device is in position to capture solar radiation.

12. A solar oven as in claim 1, wherein the positioning system comprises:
a sun tracking system that includes:
servo mechanisms that automatically adjust positioning of the radiation collection device.

13. A mounting system configured to mount a radiation collection device for a solar oven onto a building, the mounting system comprising:
an anchored pivot adapted to attach to the building;
a bracing system adapted to brace the anchored pivot against the building; and,
a radial positioning system attached to the radiation collection device allowing radial movement of the radiation collection device radially toward and radially away from a location at which the anchored pivot is braced against the building, the positioning system including:
a structural extension assembly extending radially out from the anchored pivot, the structural extension assembly including at least one channel rail member,
a moveable carriage that travels along the at least one channel rail member, the moveable carriage being adapted to transport a radiation collection device along the at least one channel rail member radially toward or away from the anchored pivot allowing the radiation collection device to be drawn close to the building when loading food into the radiation collection device and allowing the radiation collection device to be moved away from the building when seeking sunlight unobstructed by the building, a carriage control system that controls location of the moveable carriage along the at least one channel rail member, the carriage control system being configured so a user located near the anchored pivot can use the carriage control system to control movement of the moveable carriage along the at least one channel rail member even when the moveable carriage is beyond reach of the user.

14. A mounting system as in claim 13, wherein the carriage control system includes a hand wheel located near the anchored pivot.

15. A mounting system as in claim 13:
wherein the moveable carriage includes a pedestal base on which the radiation collector is mounted, the pedestal base being mounted on a pivot around which the pedestal base can be rotated;
wherein the structural extension assembly includes a drive shaft that runs the length of the structural extension assembly;
wherein the carriage control system includes an adjust control located near the anchored pivot; and,
wherein the pedestal base, the drive shaft and the adjust control are configured so as a user turns the adjust control, the drive shaft rotates which causes the pedestal base to rotate around the pivot.

16. A mounting system as in claim 13:
wherein the solar oven includes a food rack on which food is placed;
wherein the moveable carriage includes a carriage altitude gear and winch mechanism that rotates the radiation collector to face more upward or more downward;
wherein the structural extension assembly includes a drive shaft that runs the length of the structural extension assembly;
wherein the carriage control system includes an adjust control located near the anchored pivot; and, wherein the carriage altitude gear and winch mechanism, the drive shaft and the adjust control are configured so as a user turns the adjust control, the drive shaft rotates which causes the carriage altitude gear and winch mechanism to rotate the radiation collector to face more upward or more downward without rotating the food rack.

17. A mounting system as in claim 13, wherein the positioning system comprises:
a sun tracking system that includes:
servo mechanisms that automatically adjust positioning of the radiation collection device.

18. A mounting system as in claim 13, wherein mounting system additionally includes:
a support foundation from which the anchored pivot extends, and
a wall anchor that is configured to hold the anchored pivot against an outside wall of the building.

19. A mounting system as in claim 13, additionally comprising:
a control system that comprises:
an azimuth positioning control mechanism that rotates the radiation collection device for solar azimuth positioning of the mounting system radiation collection device,
a solar altitude positioning control mechanism that rotates the radiation collection device for solar altitude positioning and adjustments,
a lever handle used for polar angular rotation positioning of the structural extension assembly around the anchored pivot.

20. A mounting system as in claim 13, wherein mounting system additionally includes:
a support foundation from which the anchored pivot extends, and
a wall anchor that is configured to hold the anchored pivot against an outside wall of the building, the wall mount system being additionally configured so that all vertical load forces exerted by the positioning system are directed down onto a ground area and not to the outside wall of the building.

* * * * *